(12) United States Patent
Murakami

(10) Patent No.: US 12,104,651 B2
(45) Date of Patent: Oct. 1, 2024

(54) TOLERANCE RING

(71) Applicant: TOGO SEISAKUSYO CORPORATION, Aichi (JP)

(72) Inventor: Joji Murakami, Aichi-ken (JP)

(73) Assignee: TOGO SEISAKUSYO CORPORATION, Aichi-ken (JP)

( * ) Notice: Subject to any disclaimer, the term of this patent is extended or adjusted under 35 U.S.C. 154(b) by 925 days.

(21) Appl. No.: 17/262,479

(22) PCT Filed: Jun. 5, 2019

(86) PCT No.: PCT/JP2019/022398
§ 371 (c)(1),
(2) Date: Jan. 22, 2021

(87) PCT Pub. No.: WO2020/031485
PCT Pub. Date: Feb. 13, 2020

(65) Prior Publication Data
US 2021/0285500 A1    Sep. 16, 2021

(30) Foreign Application Priority Data

Aug. 7, 2018 (JP) .................................. 2018-148296

(51) Int. Cl.
*F16D 1/08*       (2006.01)
*F16D 7/02*       (2006.01)

(52) U.S. Cl.
CPC .......... *F16D 1/0835* (2013.01); *F16D 7/021* (2013.01); *F16D 2200/0021* (2013.01);
(Continued)

(58) Field of Classification Search
CPC ... F16D 7/021; F16D 1/0835; Y10T 403/7061
See application file for complete search history.

(56) References Cited

U.S. PATENT DOCUMENTS

| | | | |
|---|---|---|---|
| 8,363,359 B2 * | 1/2013 | Slayne | G11B 21/02 384/535 |
| 9,019,663 B2 * | 4/2015 | Araki | G11B 5/48 360/265.2 |

(Continued)

FOREIGN PATENT DOCUMENTS

| | | |
|---|---|---|
| JP | 2012-52638 A | 3/2012 |
| JP | 2015-517065 A | 6/2015 |

(Continued)

*Primary Examiner* — Michael P Ferguson
(74) *Attorney, Agent, or Firm* — Christensen, Fonder, Dardi & Herbert PLLC

(57) ABSTRACT

A tolerance ring includes a ring body having a spring property, an abutment joint portion formed between circumferential end edges of the ring body, and protrusions protruding radially from the ring body, each having a reaction force due to radial rigidity. The tolerance ring includes an abutment joint semi-circumferential region and an opposing semi-circumferential region facing the abutment joint portion. The tolerance ring includes first and second X-direction semi-circumferential regions separated by a straight line connecting the abutment joint and opposing portions. The Y-direction passes through the axis center of the ring body and the abutment joint, and the X-direction is orthogonal to the Y-direction. The sum of the X-direction components of the reaction force vector in the first X-direction semi-circumferential region is the same or smaller than the sum of the Y-direction components of the reaction force vector in the abutment joint semi-circumferential region.

5 Claims, 16 Drawing Sheets

(52) U.S. Cl.
CPC .. *F16D 2200/0026* (2013.01); *F16D 2300/12* (2013.01); *Y10T 403/7061* (2015.01)

(56) References Cited

U.S. PATENT DOCUMENTS

| | | |
|---|---|---|
| 9,109,632 B2 * | 8/2015 | Asakura .................. F16D 7/021 |
| 10,443,657 B2 | 10/2019 | Nakawatari et al. |
| 2012/0087044 A1 | 4/2012 | Schmidt et al. |
| 2013/0105267 A1 | 5/2013 | Nakamura et al. |
| 2013/0315654 A1 | 11/2013 | Nias et al. |
| 2018/0372164 A1 | 12/2018 | Nakamura et al. |

FOREIGN PATENT DOCUMENTS

| | | |
|---|---|---|
| JP | 2017-36785 A | 2/2017 |
| JP | 2017-53385 A | 3/2017 |

* cited by examiner

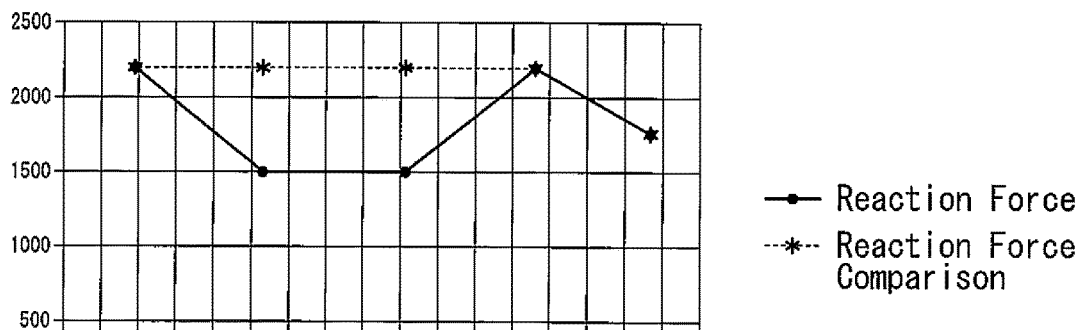
FIG. 23
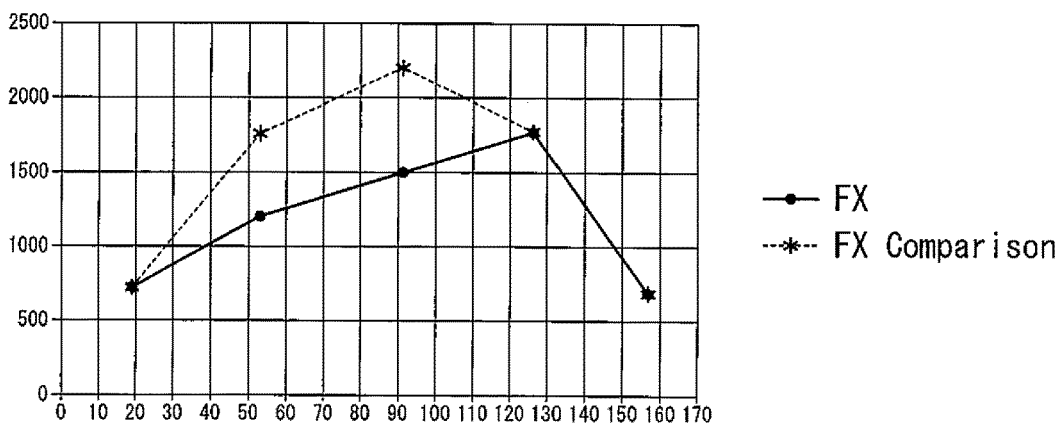
FIG. 24
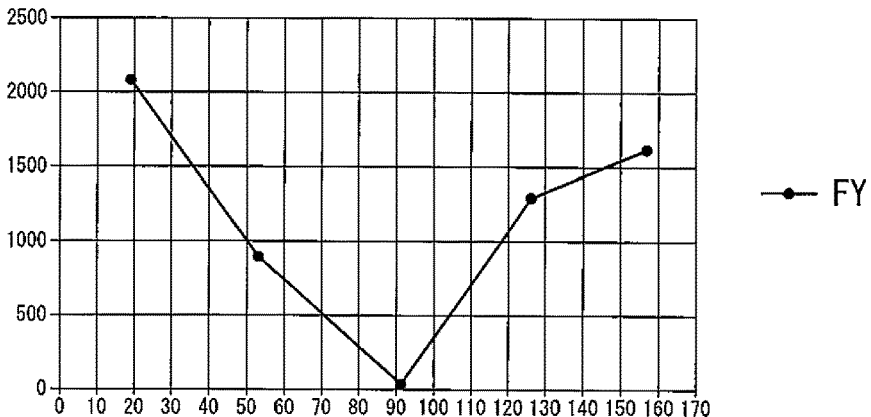
FIG. 25
| | Reaction Force (N) |
|---|---|
| ΣFY1 | 5912.2 |
| ΣFY2 | 5940.6 |
| ΣFX1=ΣFX2 | 5895.3 |
| ΣFY2−ΣFY1 | 28.4 |
| ΣFX1/ΣFY1 | 0.997 |
| ΣFX1/ΣFY2 | 0.992 |
FIG. 26

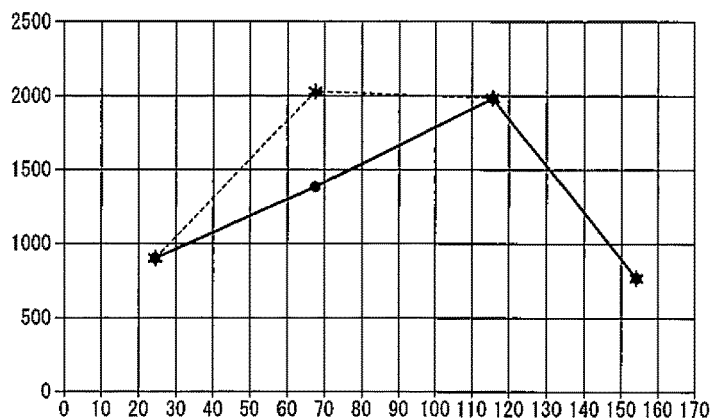
FIG. 27
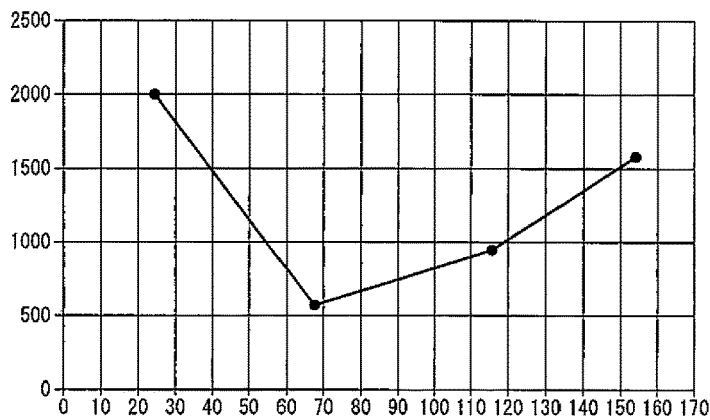
FIG. 28
| | Reaction Force (N) |
|---|---|
| ΣFY1 | 5063.7 |
| ΣFY2 | 5169.8 |
| ΣFX1=ΣFX2 | 5036.6 |
| ΣFY2−ΣFY1 | 106.1 |
| ΣFX1/ΣFY1 | 0.995 |
| ΣFX1/ΣFY2 | 0.974 |
FIG. 29
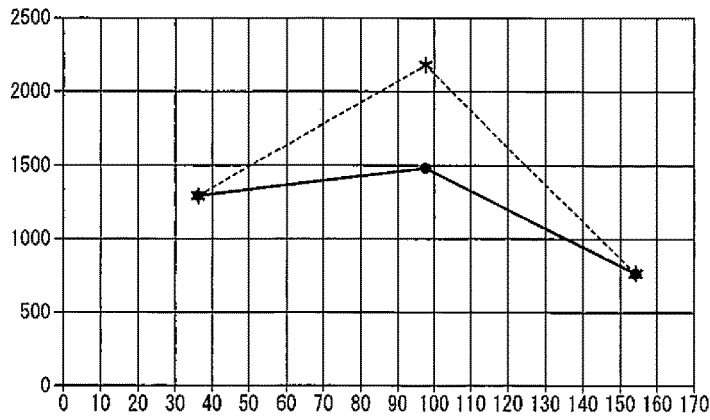
FIG. 30

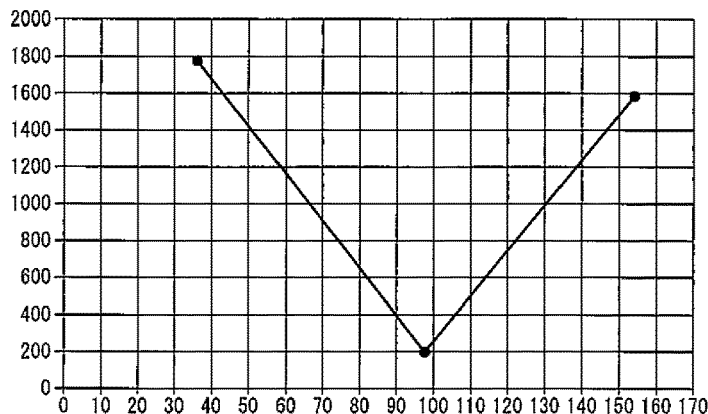
FIG. 31
| | Reaction Force (N) |
|---|---|
| ΣFY1 | 3569.7 |
| ΣFY2 | 3554.7 |
| ΣFX1=ΣFX2 | 3552.4 |
| ΣFY2−ΣFY1 | −15.1 |
| ΣFX1/ΣFY1 | 0.995 |
| ΣFX1/ΣFY2 | 0.999 |
FIG. 32
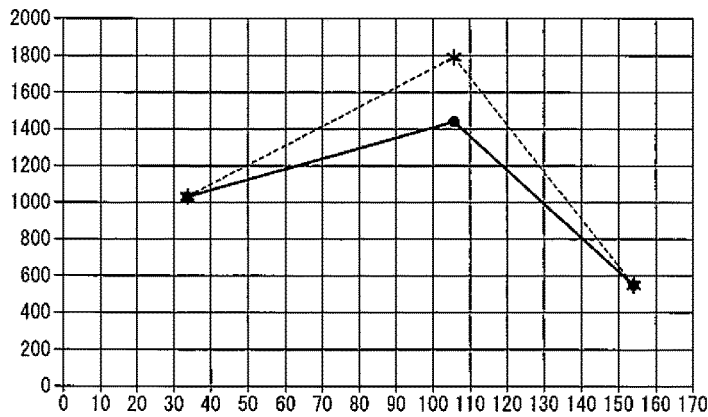
FIG. 33
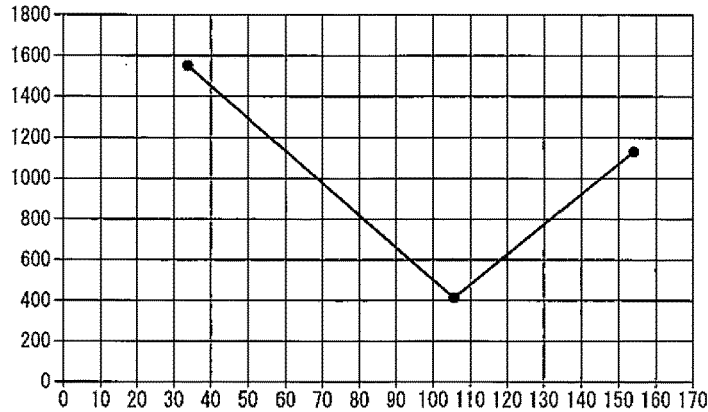
FIG. 34

|  | Reaction Force (N) |
|---|---|
| $\Sigma FY1$ | 3089.5 |
| $\Sigma FY2$ | 3098.1 |
| $\Sigma FX1 = \Sigma FX2$ | 3026.6 |
| $\Sigma FY2 - \Sigma FY1$ | 8.6 |
| $\Sigma FX1 / \Sigma FY1$ | 0.980 |
| $\Sigma FX1 / \Sigma FY2$ | 0.977 |
FIG. 35
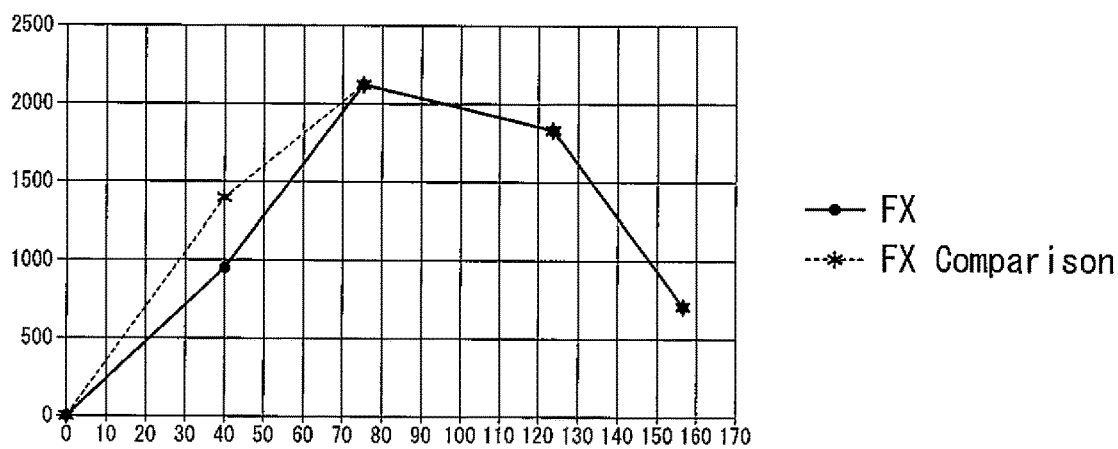
FIG. 36
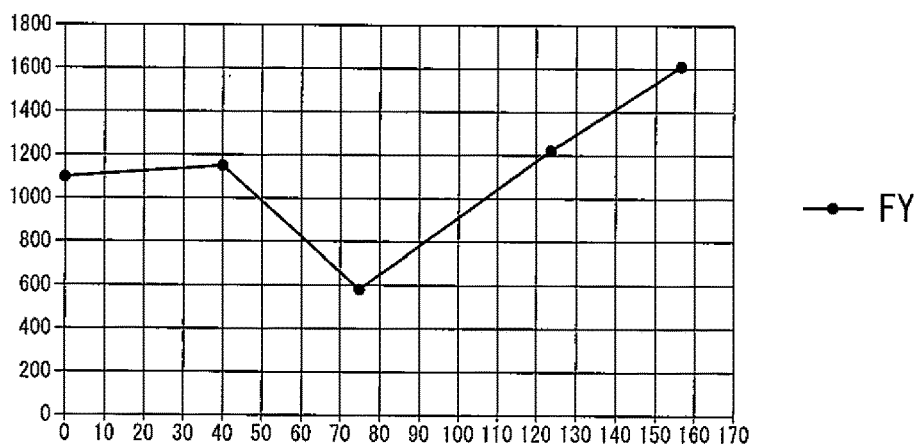
FIG. 37
|  | Reaction Force (N) |
|---|---|
| $\Sigma FY1$ | 5671.4 |
| $\Sigma FY2$ | 5665.7 |
| $\Sigma FX1 = \Sigma FX2$ | 5616.6 |
| $\Sigma FY2 - \Sigma FY1$ | −5.7 |
| $\Sigma FX1 / \Sigma FY1$ | 0.990 |
| $\Sigma FX1 / \Sigma FY2$ | 0.991 |
FIG. 38

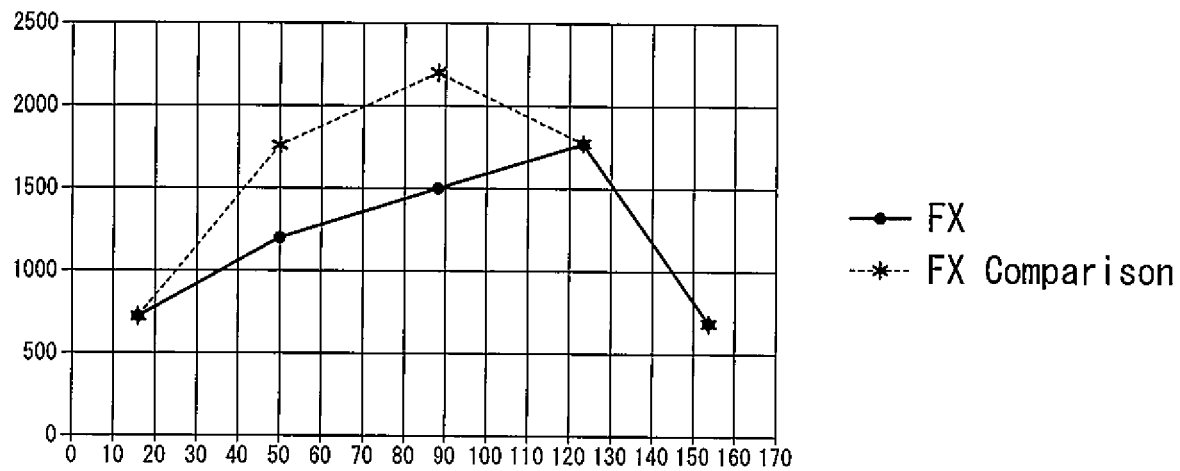
FIG. 39
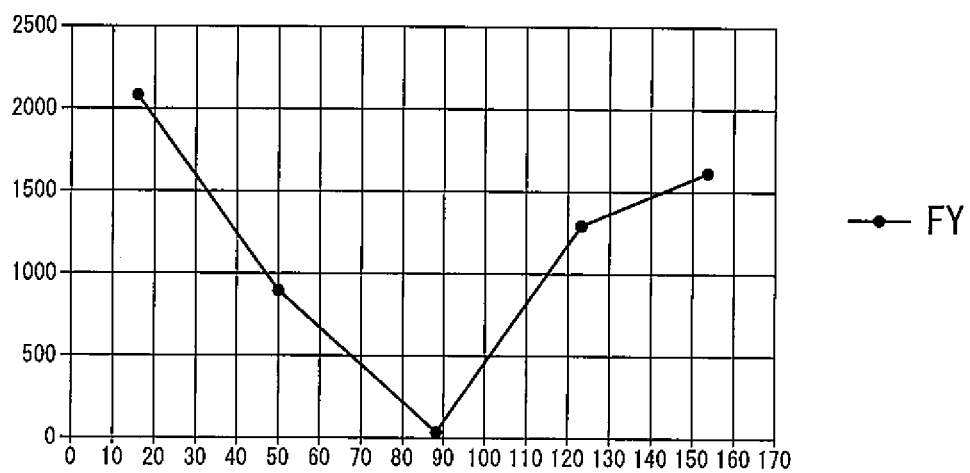
FIG. 40
|  | Reaction Force (N) |
|---|---|
| $\Sigma FY1$ | 5337.1 |
| $\Sigma FY2$ | 5593.9 |
| $\Sigma FX1 = \Sigma FX2$ | 5305.9 |
| $\Sigma FY2 - \Sigma FY1$ | 256.8 |
| $\Sigma FX1 / \Sigma FY1$ | 0.994 |
| $\Sigma FX1 / \Sigma FY2$ | 0.949 |
FIG. 41

TOLERANCE RING

CROSS-REFERENCE TO RELATED APPLICATIONS

The present application is a U.S. National Phase entry of, and claims priority to, PCT Application No. PCT/JP2019/022398, filed Jun. 5, 2019, which claims priority to Japanese Patent Application No. 2018-148296, filed Aug. 7, 2018, both of which are incorporated herein by reference in their entireties for all purposes.

BACKGROUND

The present disclosure relates to a tolerance ring.

Japanese Laid-Open Patent Publication No. 2017-53385 discloses a tolerance ring structured to be fitted between a shaft member and an outer peripheral member circumferentially enclosing the shaft member in a press-fitted manner. The tolerance ring includes a cylindrical ring body having a spring property and a plurality of protrusions radially protruding from the ring body. The protrusions have a spring property in a radial direction of the ring body. The tolerance ring is attached to the shaft member such that an inner peripheral surface of the ring body covers an outer peripheral surface of the shaft member. The tolerance ring attaches with the shaft member to the outer peripheral member. Thereby, the protrusions are pressed against the inner peripheral surface of the outer peripheral member As described in Japanese Laid-Open Patent Publication No. 2017-53385, the tolerance ring may be used while being press-fitted between a rotor shaft and an outer peripheral member radially facing the rotor shaft. The rotor shaft has a spline fitting portion, which meshes with spline teeth. The tolerance ring is used to reduce teeth rattling noise between the spline fitting portion and the spline teeth during acceleration, deceleration, etc., due to torque fluctuations.

The tolerance ring may be formed of a metal plate member having a spring property and protrusions formed thereon. The plate member is bent such that both end edges of the plate member face opposite to each other. The plate member is thus formed to be cylindrical, and an abutment joint portion is formed between both end edges of the plate member. A region including the abutment joint portion is lower in radial rigidity than any other region of the tolerance ring. For example, the tolerance ring includes a plurality of protrusions arranged at equal intervals on the ring body. In this case, the radial rigidity at the region including the abutment joint portion becomes lower than the radial rigidity of the regions other than that region.

The rotor shaft (shaft member) including the spline fitting portion receives force from the spline teeth, etc. in a radial direction. The outer peripheral member has a tubular shape having a low rigidity than that of the press-fitted tolerance ring and is easily deformed due to the reaction force of the press-fitted tolerance ring. Therefore, the outer peripheral member in contact with the regions other than the region including the abutment joint portion deforms more greatly than the outer peripheral member in contact with the region including the abutment joint portion. As a result, the tolerance ring may lead to cause, for example, an elliptical deformation of the outer peripheral member.

In view of the above, it has been conventionally desired to provide a tolerance ring that is less likely to cause deformation of an outer peripheral member.

BRIEF SUMMARY

According to one aspect of the present disclosure, a tolerance ring may be disposed between a shaft member and an outer peripheral member enclosing the shaft member in the circumferential direction. The tolerance ring may include a cylindrical ring body having a spring property, an abutment joint portion defined between both circumferential end edges of the ring body, and a plurality of protrusions protruding radially from the ring body, each having a reaction force due to radial rigidity. The tolerance ring may include an abutment joint semi-circumferential region including the abutment joint portion at its center and an opposing semi-circumferential region including an opposing portion at its center, the opposing portion facing the abutment joint portion in the radial direction. The tolerance ring may include first and second X-direction semi-circumferential regions separated by a straight line connecting the abutment joint portion and the opposing portion. The Z-direction is positioned along the axis center of the ring body, the Y-direction through the axis center of the ring body and the abutment joint portion, and the X-direction being orthogonal to the Y-direction and the Z-direction. When the reaction force vector of the reaction force of each protrusion is decomposed in an X-direction component and a Y-direction component, the sum of the X-direction component of the reaction force in the first X-direction semi-circumferential region is the same as or smaller than the sum of the Y-direction component of the reaction force in the abutment joint semi-circumferential region.

Therefore, the total force in the X-direction exerted to the outer peripheral member from the first X-direction semi-circumferential region becomes substantially the same as the total force of the Y-direction component exerted to the outer peripheral member from the abutment joint semi-circumferential region. Specifically, in traditional tolerance rings, the force exerted to the outer peripheral member tends to be relatively smaller, particularly in the near-edge region of the abutment joint portion in the abutment joint semi-circumferential region than in the other regions. In contrast, the sum of the reaction force in the X-direction component at the plurality of the protrusions located in the first X-direction semi-circumferential region is set to be equal to or less than the sum of the reaction force of the Y-direction component at the plurality of the protrusions located in the abutment joint semi-circumferential region. As a result, it was found that the force actually exerted to the inner peripheral surface of the outer peripheral member becomes substantially constant. Because the outer peripheral member may be cylindrical and weak in rigidity, it may easily deform due to the reaction force of the press-fitted tolerance ring. However, utilizing tolerance rings similar to that discussed above, the outer peripheral member may thus deform in a shape close to a perfect circle in a cross section. It is thus possible to prevent such deformation that causes the outer peripheral member to become, for example, elliptical.

According to another aspect of the present disclosure, the difference in the sum of the Y-direction components of the reaction force in the abutment joint semi-circumferential region and the sum of the Y-direction components of the reaction force in the opposing semi-circumferential region is equal to or less than 10% of the sum of the Y-direction components of the reaction force in the opposing semi-circumferential region. Therefore, the force in the Y-direction exerted to the outer peripheral member from the abutment joint semi-circumferential region becomes substantially the same as the force of the Y-direction component exerted to the outer peripheral member from the opposing semi-circumferential region. Since the outer peripheral member may be cylindrical and weak in rigidity, it may easily deform due to the reaction force of the press-fitted tolerance ring. Accordingly, the outer peripheral member may thus deform in a shape close to a perfect circle in cross section.

According to another aspect of the present disclosure, the plurality of protrusions may include various types of protrusions with different circumferential widths and/or axial lengths. Therefore, the radial reaction force due to the rigidity of the protrusions can be increased, for example, by narrowing the circumferential width. It is thus possible to set the reaction forces of the protrusions, more specifically, the X- and Y-direction reaction forces may be set at a predetermined magnitude utilizing a relatively simple structure.

According to another aspect of the present disclosure, the abutment semi-circumferential region and the opposing semi-circumferential region may include protrusions, each of which has approximately the same rigidity. Setting of the sum of the X-direction components of the reaction force and the sum of the Y-direction components of the reaction force based on the arrangement of the protrusions can be facilitated. This facilitates design the tolerance ring, which can further reduce the deformation influence on the outer peripheral member.

According to another aspect of the present disclosure, the number of the protrusions in the opposing semi-circumferential region is greater than the number of the protrusions in the abutment joint semi-circumferential region. The protrusions are counted so as not to include a protrusions that traverse the boundary between the abutment joint semi-circumferential region and the opposing semi-circumferential region. Therefore, the protrusions formed in the near-edge region of the opposing portion are more closely arranged than in the other regions. More specifically, the force exerted to the outer peripheral member, particularly in the near-edge region of the abutment joint portion in the abutment joint semi-circumferential region, tends to be smaller than in other regions. The force exerted to the outer peripheral member, particularly in the near-edge region of the opposing portion in the opposing semi-circumferential region, tends to be smaller than in other regions, similar to the force in the near edge region of the abutment joint portion. Therefore, the rigid protrusions are formed in the abutment joint semi-circumferential region, and the protrusions are closely arranged in the near-edge region of the opposing portion. With this structure, it is possible to prevent the outer peripheral member from deforming, particularly, into an elliptical shape extending in the X-direction.

BRIEF DESCRIPTION OF THE DRAWINGS

FIG. 23 is a graph showing the circumferential distribution of the radial reaction force of the tolerance ring along an X-direction of the semi-circumferential region of FIG. 1.

FIG. 24 is a graph showing the circumferential distribution of the X-direction components of the reaction force of FIG. 23.

FIG. 25 is a graph showing the circumferential distribution of the Y-direction components of the reaction force of FIG. 23.

FIG. 26 is a table comparing the sum of the X-direction components with the sum of the Y-direction components of the radial reaction force of the tolerance ring of FIG. 1.

FIG. 27 is a graph showing the circumferential distribution of the X-direction components of the radial reaction force along the X-direction of the semi-circumferential region of FIG. 6.

FIG. 28 is a graph showing the circumferential distribution of the Y-direction components of the radial reaction force along the X-direction of the semi-circumferential region of FIG. 6.

FIG. 29 is a table comparing the sum of the X-direction components with the sum of the Y-direction components of the radial reaction force of the tolerance ring of FIG. 6.

FIG. 30 is a graph showing the circumferential distribution of the X-direction components of the radial reaction force along the X-direction of the semi-circumferential region of FIG. 9.

FIG. 31 is a graph showing the circumferential distribution of the Y-direction components of the radial reaction force along the X-direction of the semi-circumferential region of FIG. 9.

FIG. 32 is a table comparing the sum of the X-direction components with the sum of the Y-direction components of the radial reaction force of the tolerance ring of FIG. 9.

FIG. 33 is a graph showing the circumferential distribution of the X-direction components of the radial reaction force along the X-direction of the semi-circumferential region of FIG. 12.

FIG. 34 is a graph showing the circumferential distribution of the Y-direction components of the radial reaction force along the X-direction of the semi-circumferential region of FIG. 12.

FIG. 35 is a table comparing the sum of the X-direction components with the sum of the Y-direction components of the radial reaction force of the tolerance ring of FIG. 12.

FIG. 36 is a graph showing the circumferential distribution of the X-direction components of the radial reaction force along the X-direction of the semi-circumferential region of FIG. 17.

FIG. 37 is a graph showing the circumferential distribution of the Y-direction components of the radial reaction force along the X-direction of the semi-circumferential region of FIG. 17.

FIG. 38 is a table comparing the sum of the X-direction components with the sum of the Y-direction components of the radial reaction force of the tolerance ring of FIG. 17.

FIG. 39 is a graph showing the circumferential distribution of the X-direction components of the radial reaction force along the X-direction of the semi-circumferential region of FIG. 20.

FIG. 40 is a graph showing the circumferential distribution of the Y-direction components of the radial reaction force along the X-direction of the semi-circumferential region of FIG. 20.

FIG. 41 is a table comparing the sum of the X-direction components with the sum of the Y-direction components of the radial reaction force of the tolerance ring of FIG. 20.

DETAILED DESCRIPTION

Figure 1:
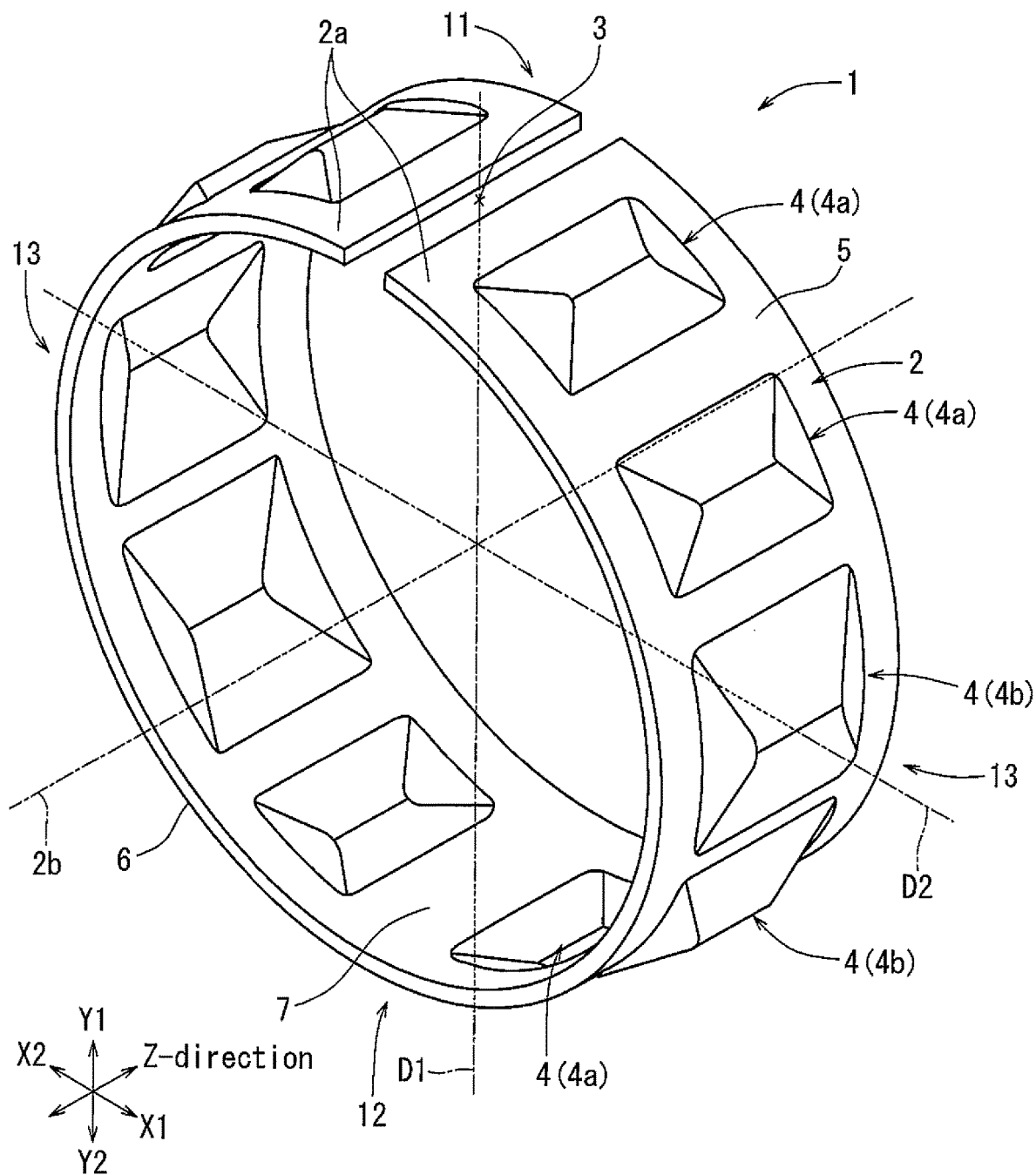
FIG. 1 is a perspective view of a tolerance ring according to a first embodiment.
Figure 2:
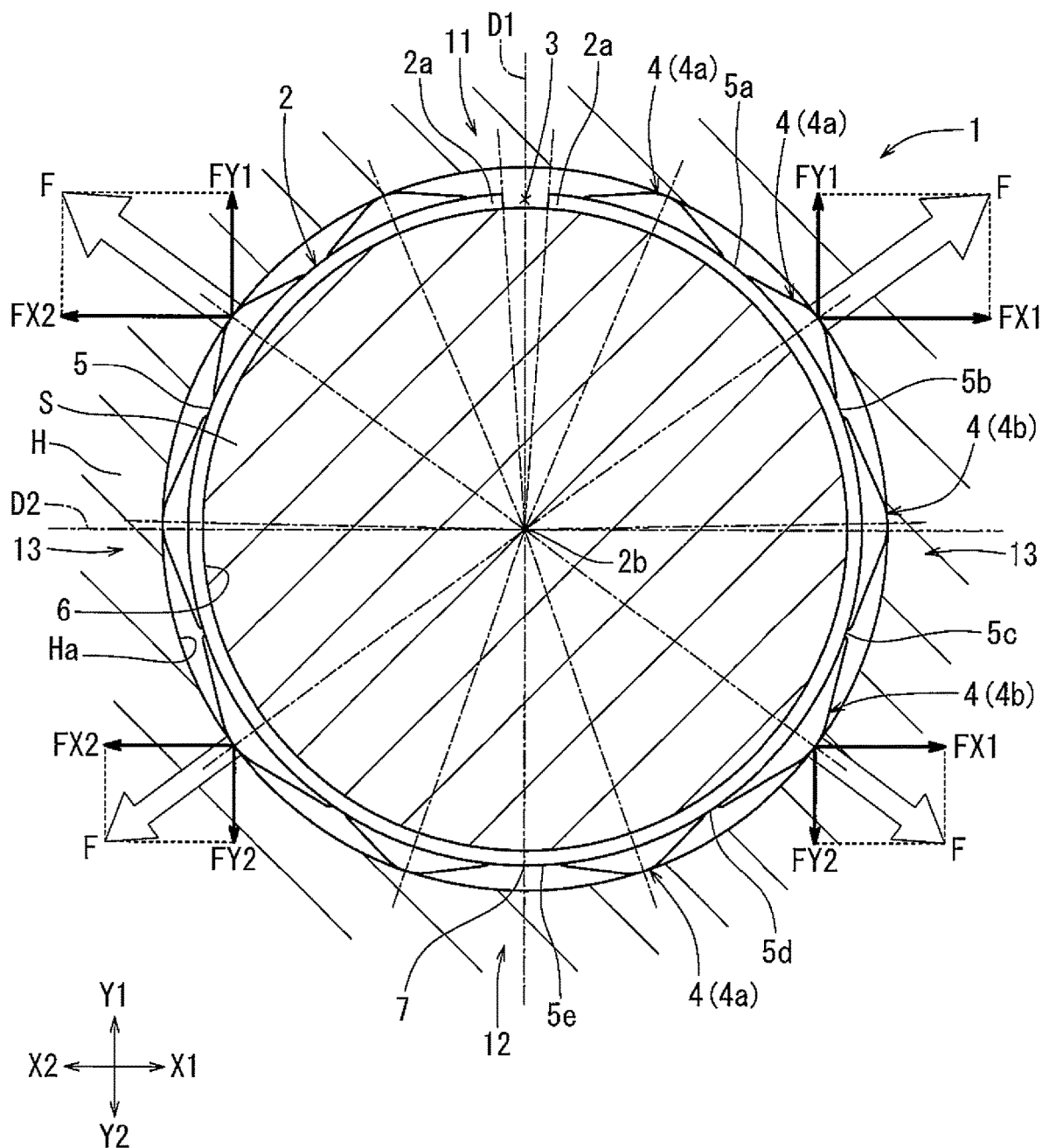
FIG. 2 is a front view of the tolerance ring of FIG. 1.

One embodiment of the present disclosure will be described with reference to FIGS. 1 to 5, and FIGS. 23 to 26. As shown in FIG. 1, a tolerance ring 1 according to a first embodiment includes a cylindrical ring body 2 and a plurality of protrusions 4. As shown in FIG. 2, the tolerance ring 1 is used while being fitted between a shaft member S and an outer peripheral member H. The shaft member S is, for example, a rotor shaft having a spline fitting portion.

The shaft member (e.g., a rotor shaft) S is a columnar and, for example, solid metal member. The outer peripheral member H may have, for example, a cylindrical shape. The shaft member S is inserted into the center hole of the outer peripheral member H. The outer peripheral member H has an inner peripheral surface Ha radially facing the rotor shaft. The inner peripheral surface Ha encloses the rotor shaft in a circumferential direction. A cylindrical clearance having a short radial length is formed between the shaft member S and the outer peripheral member H. The tolerance ring 1 is fitted in this cylindrical clearance in a press-fitted manner.

As shown in FIG. 1, the ring body 2 may be formed, for example, in a cylindrical shape by rolling a strip plate material having a spring property. The strip plate material is formed of a metal material, such as iron or alloy steel, such as high carbon steel or stainless steel, non-ferrous metal, such as copper or nickel, metal alloy, or the like.

As shown in FIG. 1, the ring body 2 includes end edges 2a in the circumferential direction and in a direction corresponding to its longitudinal direction. The both end edges 2a face opposite to each other, and an abutment joint portion 3 is formed between the end edges 2a. A plurality of, for example ten, protrusions 4 may be formed on the ring body 2. The plurality of the protrusions 4 protrude radially outward from the ring body 2 and each have a reaction force due to their radial rigidity. The plurality of protrusions 4 are located in the axial center region of the ring body 2 and are disposed in one row at predetermined intervals in the circumferential direction. The ring body 2 has an outer peripheral cylindrical surface 5 with no protrusions 4 formed. The outer peripheral cylindrical surface 5 includes a region extending along both axial end edges of the ring body 2 and a region axially extending between the protrusions 4.

As shown in FIG. 2, the outer peripheral cylindrical surface 5 and the inner peripheral portion 6, which is an inner peripheral side of the ring body 2, are substantially circular in a cross section orthogonal to an axis center line 2b of the ring body 2. The tolerance ring 1 has an opposing portion 7 radially facing the abutment joint portion 3 on a line connecting the abutment joint portion 3 and passing through the axis center line 2b of the ring body 2.

As shown in FIG. 2, the inner peripheral portion 6 comes in contact with the outer peripheral portion of the shaft member S while the tolerance ring 1 is fitted to the shaft member S. The tops of the protrusions 4 are pressed by the inner peripheral surface Ha of the outer peripheral member H. The shaft member S and outer peripheral member H are subjected to a reaction force caused by the spring property of the ring body 2 and the radial rigidity of each of the protrusions 4. The shaft member S is subjected to the reaction force in a direction toward its shaft center. The outer peripheral member H is subjected to the reaction force in a radially outward direction, which is a direction generally opposite to the reaction force received by the shaft member S. The shaft member S and/or the outer peripheral member H may deform due to the reaction force. Since the shaft member S is solid, the deformation due to being compressed is small. In contrast, since the outer peripheral member H is hollow, the deformation tends to be greater than that of the shaft member S. Therefore, a risk of deformation due to the reaction force of the tolerance ring 1 is mainly extended to the outer peripheral member H.

As shown in FIG. 1, the tolerance ring 1 can be described with reference to X-, Y-, and Z-directions, which are orthogonal to each other. The Z-direction is a direction along the axis center line 2b of the ring body 2. The Y-direction extends along a straight line D1 connecting the axis center line 2b of the ring body 2 and the abutment joint portion 3. The X-direction is orthogonal to both the Y-direction and Z-direction, and extends along a straight line D2, which passes through the axis center line 2b. In other words, the straight line D1 extends in the Y-direction, while the straight line D2 extends in the X-direction.

As shown in FIG. 2, a direction parallel to a direction directing from the axis center line 2b of the ring body 2 toward the abutment joint portion 3 (upward direction in FIG. 2) is defined as a Y1 direction. The Y1 direction is oriented upward from the straight line D2. A direction parallel to a direction directing from the axis center of the ring body 2 toward the opposing portion 7 (downward direction in FIG. 2) is defined as a Y2 direction. The Y2 direction is oriented downward from the straight line D2. A direction parallel to a direction directing from the axis center of the ring body 2 toward the right direction is defined as an X1 direction. The X1 direction is oriented from the straight line D1 to the right. A direction parallel to a direction directing from the axis center of the ring body 2 to the left direction is defined as an X2 direction. The X2 direction is oriented from the straight line D1 to the left.

As shown in FIG. 2, the tolerance ring 1 includes an abutment joint semi-circumferential region 11 and an opposing semi-circumferential region 12 separated by the straight line D2. The abutment joint semi-circumferential region 11 includes the abutment joint portion 3, and may, for example, include the abutment joint portion 3 at the center of a circular arc. The opposing semi-circumferential region 12 includes the opposing portion 7, and may, for example, include the opposing portion 7 at the center of a circular arc. The tolerance ring 1 includes a first X-direction semi-circumferential region 13 and a second X-direction semi-circumferential region 13 separated by the straight line D1. The first and second X-direction semi-circumferential regions 13 include a portion of the abutment joint portion 3 at one end and a portion of the opposing portion 7 at the other end.

Figure 3:
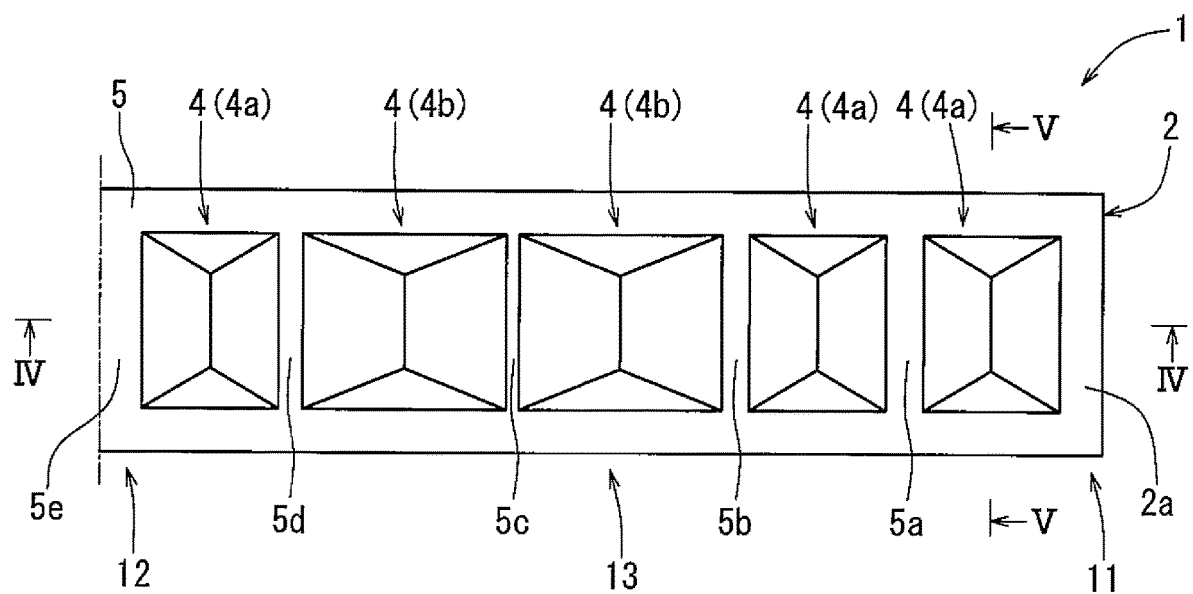
FIG. 3 is a plan view of the tolerance ring of FIG. 1, with a half of the circumferential portion expanded.
Figure 4:
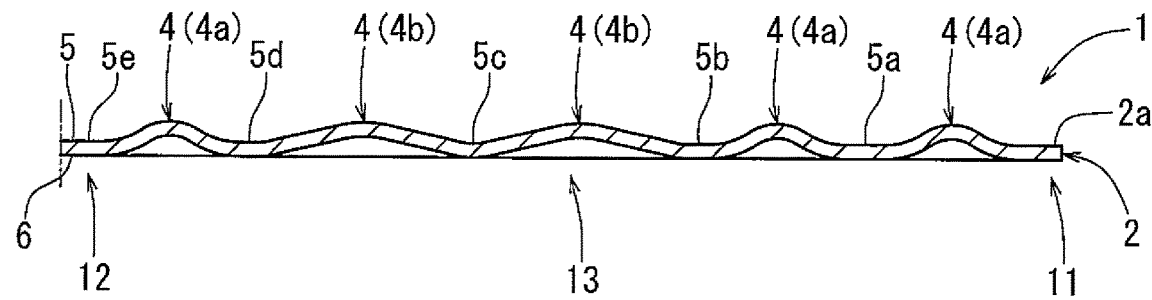
FIG. 4 is a cross-sectional view taken along line IV-IV in FIG. 3.
Figure 5:
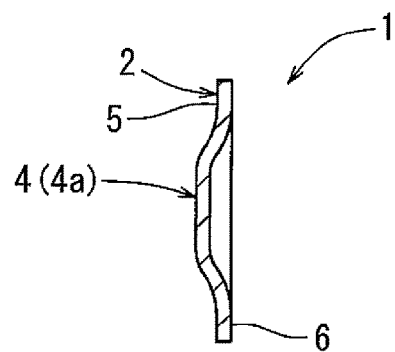
FIG. 5 is a cross-sectional view taken along line V-V in FIG. 3.

As shown in FIG. 2, the first and second X-direction semi-circumferential regions 13 are symmetrical to each other with respect to the straight line D1. The plurality of the protrusions 4 are located in positions to be symmetrical to each other with respect to the straight line D1. As shown in FIG. 3, the protrusions 4 are rectangular in a planner view. As shown in FIG. 4, the protrusions 4 protrude radially outward from the ring body 2 and have a triangular ridge shape in a cross-section as seen from the Z-direction. As shown in FIG. 5, the protrusions 4 have a trapezoidal ridge shape in a cross-section obtained by cutting the ring body 2 in the axial direction.

As shown in FIGS. 2 to 4, a small protrusion 4a, an interval 5a, a small protrusion 4a, an interval 5b, a large protrusion 4b, an interval 5c, a large protrusion 4b, an interval 5d, a small protrusion 4a, and an interval 5e are formed in this order on the outer peripheral cylindrical surface 5 of the first X-direction semi-circumferential region 13, from the end edge 2a and along the circumferential direction. The interval 5b has a shorter circumferential length than that of the interval 5a. The interval 5c has an even shorter circumferential length than that of the interval 5b. The interval 5d has substantially the same circumferential length as that of the interval 5b. The interval 5e has a longer circumferential length than that of the interval 5a. The distance between the pair of small protrusions 4a with the opposing portion 7 placed therebetween is equivalent to twice the interval 5e.

As shown in FIG. 2, the small protrusions 4a have substantially the same radial height as the large protrusions 4b. Therefore, the tops of the small protrusions 4a and the tops of the large protrusions 4b may evenly come in contact with the inner peripheral surface Ha, having substantially a circular cross-section, of the outer peripheral member H. As shown in FIG. 3, the large protrusions 4b have substantially the same axial length as the small protrusions 4a. On the other hand, the large protrusions 4b are longer in circumferential length than the small protrusions 4a. For example, the large protrusions 4b may be, for example 10 to 50%, longer in the circumferential length than the small protrusions 4a. The rigidity of the region including the large protrusions 4b may thus be, for example 20% to 40%, lower than the rigidity in the region including the small protrusions 4a.

As shown in FIG. 2, the pair of first small protrusions 4a, the pair with the abutment joint portion 3 interposed therebetween in the circumferential direction, is formed near the edge of the respective end edges 2a in the abutment joint semi-circumferential region 11. The pair of second small protrusions 4a, a pair mirrored across the straight line D1, is formed with the pair of first small protrusions 4a and the pair of intervals 5a interposed therebetween. The pair of first large protrusions 4b, including their tops, is formed and located next to respective second small protrusions 4a via respective intervals 5b.

As shown in FIG. 2, the interval 5e is formed at the opposing portion 7 located in the opposing semi-circumferential region 12. A pair of the third small protrusions 4a, a pair mirrored across straight line D1, is formed with the interval 5e interposed therebetween in the circumferential direction. A pair of the second large protrusions 4b, a pair mirrored across straight line D1, is formed with the interval 5e, the third small protrusions 4a, and the intervals 5d interposed therebetween. The pair of first large protrusions 4b, excluding their tops, is formed and located next to respective second large protrusions 4b via respective intervals 5c.

As shown in FIG. 2, the reaction force, which is due to the rigidity of the protrusions 4, of the tolerance ring 1 acts radially from the tops of the protrusions 4 against the portion of the outer peripheral member H enclosing the outer circumference of the tolerance ring 1. The reaction force vector F acting from the top of each protrusion 4 is divided into force vector components, such as a Y1-direction component FY1, a Y2-direction component FY2, an X1-direction component FX1, and an X2-direction component FX2. The X-direction component and the Y-direction component of this reaction force vector F will be described based on the analysis results shown in FIGS. 23 to 26. A right side of each graph in FIGS. 23 to 25 (the side at 170° of the horizontal axis) is the side of the abutment joint portion 3 of the ring member 2, while a left side of each graph (the side at 0° of the horizontal axis) is the side of the opposing portion 7 of the ring member 2.

As shown in FIG. 2, the first and second X-direction semi-circumferential regions 13 are symmetrical to each other with respect to the straight line D1. Therefore, circumferential distributions of the X2-direction component FX2 and the X1-direction component FX1 of the reaction force vector F are symmetrical. Thus, since the X2-direction component FX2 of the reaction force vector F is effectively the same as the X1-direction component FX1 in the analysis result, merely the X1-direction component FX1 will be described, and the description for the X2-direction component FX2 will be omitted. FIG. 24 shows the circumferential distribution of the X1-direction component FX1 of the first X-direction semi-circumferential region 13. In FIG. 25, 0° to 90° along the horizontal axis indicates the circumferential distribution of the Y2-direction component FY2 of the first X-direction semi-circumferential region 13. 90° to 170° along the horizontal axis indicates the circumferential distribution of the Y1-direction component FY1 of the first X-direction semi-circumferential region 13. Therefore, the sum of the Y2-direction components ΣFY2 of the opposing semi-circumferential region 12 is indicated by doubling the reaction force of 0° to 90° indicated in FIG. 25. The sum of the Y1-direction components ΣFY1 of the abutment joint semi-circumferential region 11 is indicated by doubling the reaction force of 90° to 170° indicated in FIG. 25.

A comparative tolerance ring in FIGS. 23 and 24 includes a plurality of protrusions having identical shapes. In other words, in the comparative tolerance ring in FIGS. 23 and 24, the positions of the tops of the protrusions are identical to the positions of the tops of the protrusions 4 of the tolerance ring 1 of this embodiment, however all the large protrusions 4b of the tolerance ring 1 described in this embodiment are replaced with the small protrusions for the comparative tolerance ring.

As shown in FIG. 23, the reaction force vector F of both the tolerance ring 1 of this embodiment and the comparative tolerance ring due to the radial rigidity in the near-edge region of the abutment joint portion 3 (right side in FIG. 23)

is smaller than that of the small protrusions in the other regions. Additionally, the reaction force vector F due to the radial rigidity in the region (the region between about 40° and 100° in FIG. 23) of the tolerance ring 1 where the large protrusions 4b are formed is weaker than that in the corresponding region of the comparative tolerance ring. This is because the rigidity of the large protrusions 4b is lower than the rigidity of the small protrusions 4a. As shown in FIG. 24, the X1-direction component FX1 of the reaction force vector F in the region of the tolerance ring 1 where the large protrusions 4b are formed is less than that of the corresponding region of the comparative tolerance ring.

As shown in FIG. 26, the sum $\Sigma FY2$ of the Y2-direction component FY2 of the reaction force vector F in the opposing semi-circumferential region 12 is slightly greater than the sum $\Sigma FY1$ of the Y1-direction component FY1 of the reaction force vector F in the abutment joint semi-circumferential region 11, by about 0.5% of the sum of the Y2-direction component $\Sigma FY2$. The sum of the X1-direction component $\Sigma FY1$ (which is equal to the sum of the X2-direction component $\Sigma FY2$) reaction force vector F in the first X-direction semi-circumferential region 13 is 99.7% of the sum of the Y1-direction component $\Sigma FY1$, and is 99.2% of the sum of the Y2-direction component $\Sigma FY2$. In other words, the sum of the X1-direction component $\Sigma FX1$ is set to be slightly less than both the sum of the Y1-direction component $\Sigma FY1$ and the sum of the Y2-direction component $\Sigma FY2$.

Referring to FIG. 2 and FIG. 26, the sum $\Sigma FY1$ of the X-direction component FX1 of the reaction force vector F in the first X-direction semi-circumferential region 13 is only slightly less than the sum $\Sigma FY1$ of the Y1-direction component FY1 of the reaction force vector F in the abutment joint semi-circumferential region 11. Therefore, the X-direction component force exerted from the first X-direction semi-circumferential region 13 to the inner peripheral surface Ha of the outer peripheral member H is approximately the same as the force of the Y-direction component exerted from the abutment joint semi-circumferential region 11 to the inner peripheral surface Ha of the outer peripheral member H.

More specifically, the force exerted to the inner peripheral surface Ha of the outer peripheral member H tends to be relatively smaller in the near-edge region of the abutment joint portion 3 of the abutment joint semi-circumferential region 11 than in other regions. However, the sum $\Sigma FY1$ of the reaction force vector FX1 of the X1-direction component of the plurality of the protrusions 4 located in the first X-direction semi-circumferential region 13 is set to be equal to or less than the sum $\Sigma FY1$ of the reaction force vector FY1 of the Y1-direction component of the plurality of protrusions 4 located in the abutment joint semi-circumferential region 11. As a result, it was found that the force actually exerted to the inner peripheral surface Ha of the outer peripheral member H becomes substantially constant. In other words, the outer peripheral member H deforms in a shape close to a perfect circle in a cross section. It is thus possible to prevent a deformation that causes the outer peripheral member H to become, for example, elliptical.

Referring to FIG. 2 and FIG. 26, the difference between the sum $\Sigma FY1$ of the Y1-direction component FY1 of the reaction force vector in the abutment joint semi-circumferential region 11 and the sum $\Sigma FY2$ of the Y2-direction component FY2 of the reaction force vector in the opposing semi-circumferential region 12 may be equal to or less than 10% of the sum of the Y2-direction component $\Sigma FY2$, for example within about 0.5%. The force in the Y-direction exerted from the abutment joint semi-circumferential region 11 to the inner peripheral surface Ha of the outer peripheral member H is approximately the same as the force of the Y-direction component exerted from the opposing semi-circumferential region 12 to the inner peripheral surface Ha of the outer peripheral member H. Therefore, the outer peripheral member H deforms in a shape close to a perfect circle in a cross-section.

Referring to FIG. 2 and FIG. 23, the plurality of protrusions 4, include the small protrusions 4a and the large protrusions 4b, having various widths in the circumferential direction. The radial reaction force due to the rigidity of the protrusions 4 can be enhanced by narrowing the circumferential width, as is done for the small protrusions 4a. In this way with a relatively simple structure, the reaction force of the protrusions 4, more specifically, the reaction force component FX1 in the X1 direction, the reaction force component FY1 in the Y1-direction, and the reaction force component FY2 in the Y2-direction, can be set to be predetermined magnitudes.

Referring to FIG. 2, the abutment joint semi-circumferential region 11 and the opposing semi-circumferential region 13 include the small protrusions 4a, each of which has substantially the same rigidity. Therefore, the sum $\Sigma FY1$ of the X1-direction component of the reaction force vector F, the sum $\Sigma FY1$ of the Y1-direction component of the reaction force vector F, and the sum $\Sigma FY2$ of the Y2-direction component may be easily set by appropriately arranging the protrusions. This facilitates design of a tolerance ring 1 that can reduce unfavorable deformation of the outer peripheral member H.

Figure 6:
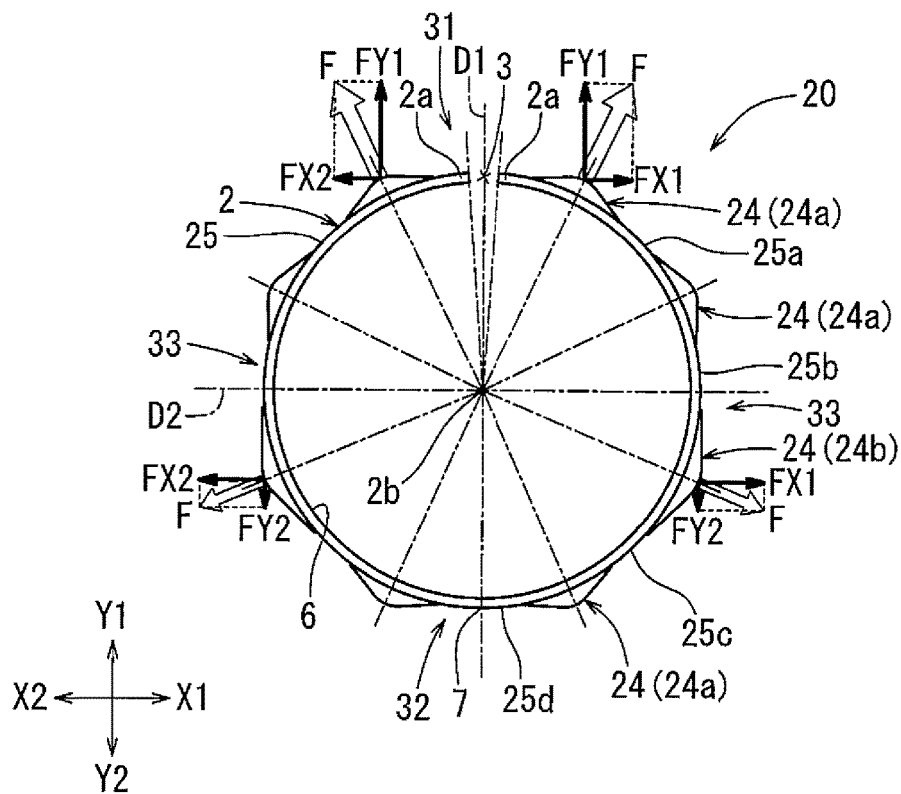
FIG. 6 is a front view of the tolerance ring according to a second embodiment.

Another embodiment will be described with reference to FIGS. 6 to 8 and FIGS. 27 to 29. A tolerance ring 20 shown in FIGS. 6 to 8, includes a plurality of, for example eight, protrusions 24 on an outer peripheral cylindrical surface 25, alternative to the plurality of the protrusions 4 and the outer peripheral cylindrical surface 5 of the tolerance ring 1 shown in FIG. 2. As shown in FIG. 6, the tolerance ring 20 includes an abutment joint semi-circumferential region 31 and an opposing semi-circumferential region 32 separated by a straight line D2. The abutment joint semi-circumferential region 31 includes an abutment joint portion 3, and may, for example, include the abutment joint portion 3 in the center of a circular arc. The opposing semi-circumferential region 32 includes the opposing portion 7, and may, for example, include an opposing portion 7 in the center of the circular arc. The tolerance ring 20 includes a first X-direction semi-circumferential region 33 and a second X-direction semi-circumferential region 33 separated by a straight line D1. Each of the first and second X-direction semi-circumferential regions 33 include the abutment joint portion 3 at one end and the opposing portion 7 at the other end.

Figure 7:
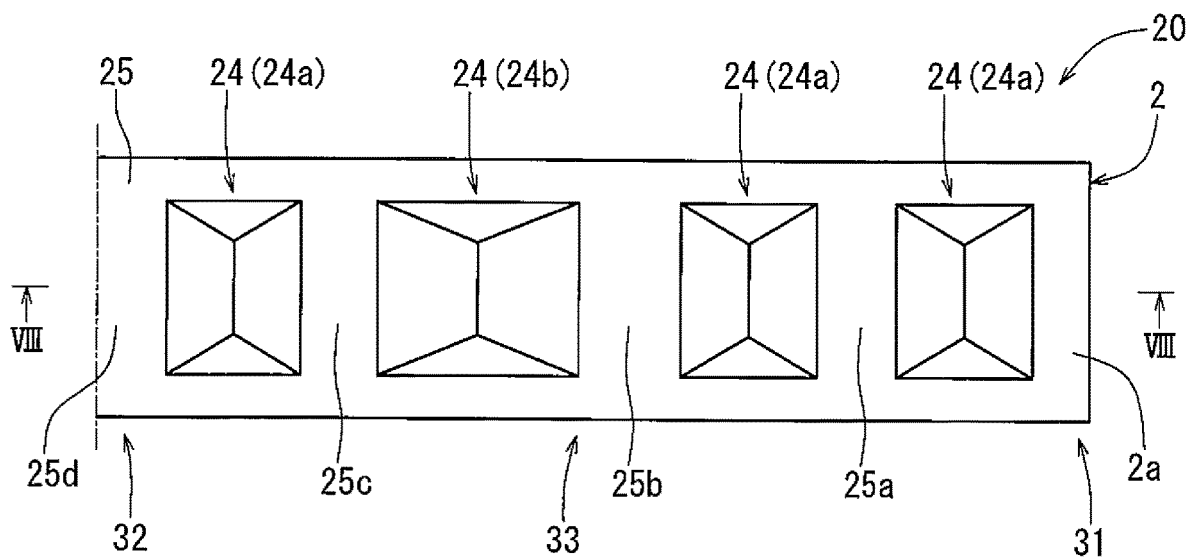
FIG. 7 is a plan view of the tolerance ring of FIG. 6, with a half of the circumferential portion expanded.
Figure 8:
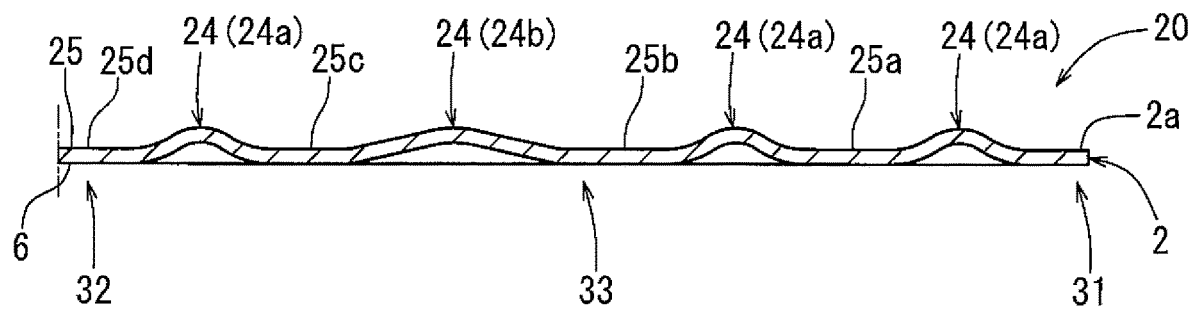
FIG. 8 is a cross-sectional view taken along line VIII-VIII in FIG. 7.

As shown in FIGS. 6 to 8, a small protrusion 24a, an interval 25a, a small protrusion 24a, an interval 25b, a large protrusion 24b, an interval 25c, a small protrusion 24a, and an interval 25d are formed in this order on the outer peripheral cylindrical surface 25 of the first X-direction semi-circumferential region 33, starting from the end edge 2a and along the circumferential direction. The interval 25b has a longer circumferential length than the interval 25a. The interval 25c has a circumferential length substantially the same as the interval 25a. The interval 25d has a shorter circumferential length than the interval 25a. The distance between the pair of small protrusions 24a on opposite sided of the opposing portion 7 placed therebetween is equivalent to twice the interval 25d.

As shown in FIG. 6, the pair of first protrusions 24a, a pair with the abutment joint portion 3 interposed therebetween in the circumferential direction, is formed near the edge of corresponding end edges 2a of the abutment joint semi-circumferential region 31. The pair of second small protrusions 24a is formed next to corresponding first small protrusions 24a, each with an interval 25a formed therebetween. A pair of intervals 25b is formed across the straight line D2 on respective circumferential sides of the pair of second small protrusions 24a.

As shown in FIG. 6, the interval 25d is formed at the opposing portion 7 in the opposing semi-circumferential region 32. The pair of third small protrusions 24a is formed with the interval 25d interposed in the circumferential direction. The pair of large protrusions 24b is formed with the interval 25d, the third small protrusions 24a, and the intervals 25c interposed therebetween. The pair of intervals 25b is formed across the straight line D2 on corresponding circumferential sides of the pair of large protrusions 24b.

The X-direction component and the Y-direction component of a reaction force vector F due to the rigidity of the protrusions 24 of the tolerance ring 20 will be described based on the analysis results shown in FIGS. 27 to 29. A right side of each graph in FIGS. 27 and 28 (the side at 170° of the horizontal axis) is the side of the abutment joint portion 3 of the tolerance ring 20, while a left side of each graph (the side at 0° of the horizontal axis) is the side of the opposing portion 7 of the tolerance ring 20. That applied in FIG. 24 may also be generally applied in FIG. 27. A comparative tolerance ring in FIG. 27 includes a plurality of protrusions, each of which has an identical shape. In other words, in the comparative tolerance ring in FIG. 27, the positions of the tops of the protrusions are identical to the positions of the tops of the protrusions 24 of the tolerance ring 20 of this embodiment, however the large protrusions 24b of the tolerance ring 20 of this embodiment are replaced with the small protrusions in the comparative example.

As shown in FIG. 27, the X1-direction component FX1 of the reaction force vector F in the region of the tolerance ring 20 where the large protrusions 24b are formed, is smaller than that in the corresponding region of the comparative tolerance ring.

As shown in FIG. 29, the sum ΣFY2 of the Y2-direction component FY2 of the reaction force vector F in the opposing semi-circumferential region 32 is greater than the sum ΣFY1 in the Y1-direction component FY1 of the reaction force vector F in the abutment joint semi-circumferential region 31, by about 2.1% of the sum of the Y2-direction components ΣFY2. The sum ΣFY1 of the X1-direction component FX1 of the reaction force vector F in the first X-direction semi-circumferential region 33 (which also equals the sum of the X2-direction components ΣFY2) is 99.5% of the sum of the Y1-direction components ΣFY1, and is 97.4% of the sum of the Y2-direction components ΣFY2. In other words, the sum of the X1-direction components ΣFY1 is set to be slightly less than both the sum of the Y1-direction components ΣFY1 and the sum of the Y2-direction components ΣFY2, i.e., substantially identical.

Referring to FIGS. 2, 6, 26, and 29, the tolerance ring 20 of this embodiment exhibits substantially the same effect as the tolerance ring 1 shown in FIG. 1. Therefore, the outer peripheral member H deforms in a shape close to a perfect circle in cross section. It is thus possible to prevent such deformation that causes the outer peripheral member H to become, for example, elliptical.

Figure 9:
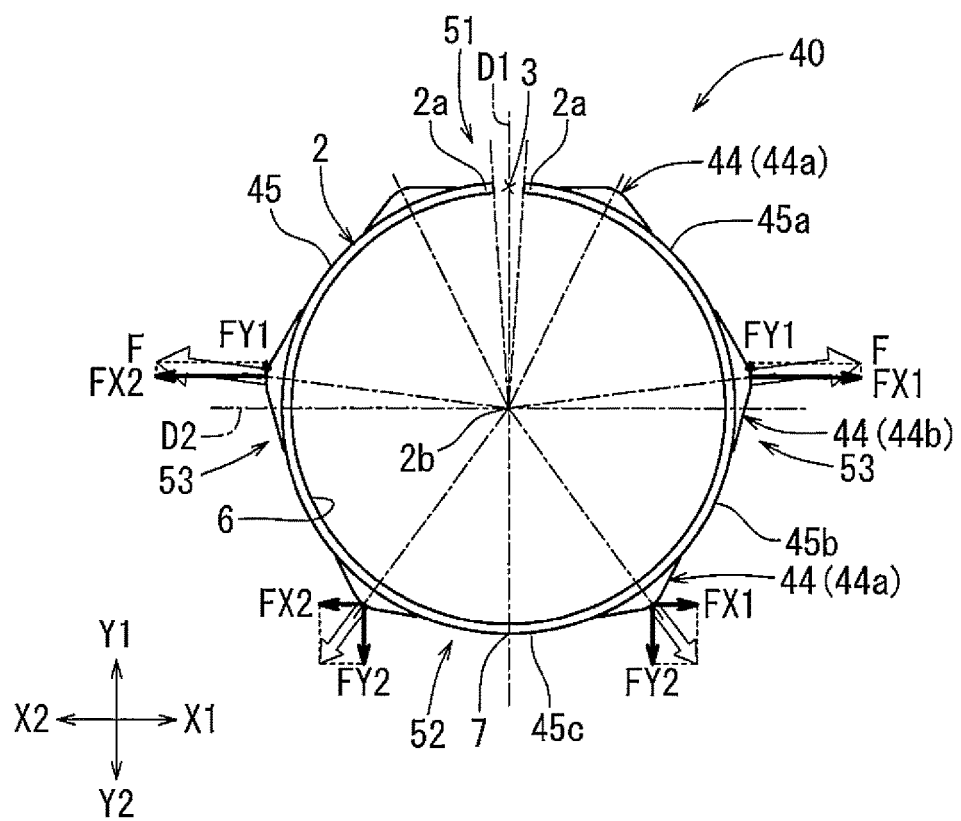
FIG. 9 is a front view of the tolerance ring according to a third embodiment.

Another embodiment will be described with reference to FIGS. 9 to 11 and FIGS. 30 to 32. A tolerance ring 40, shown in FIGS. 9 to 11, includes a plurality of, for example six, protrusions 44 on an outer peripheral cylindrical surface 45, alternative to the plurality of the protrusions 4 on the outer peripheral cylindrical surface 5 of the tolerance ring 1 shown in FIG. 2. As shown in FIG. 9, the tolerance ring 40 includes an abutment joint semi-circumferential region 51 and an opposing semi-circumferential region 52 separated by a straight line D2. The abutment joint semi-circumferential region 51 includes an abutment joint portion 3, and may, for example, include the abutment joint portion 3 in the center of a circular arc. The opposing semi-circumferential region 52 includes an opposing portion 7, and may, for example, include the opposing portion 7 in the center of the circular arc. The tolerance ring 40 includes a first X-direction semi-circumferential region 53 and a second X-direction semi-circumferential region 53 separated by a straight line D1. The first and second X-direction semi-circumferential regions 53 each include the abutment joint portion 3 at one end and the opposing portion 7 at the other end.

Figure 10:
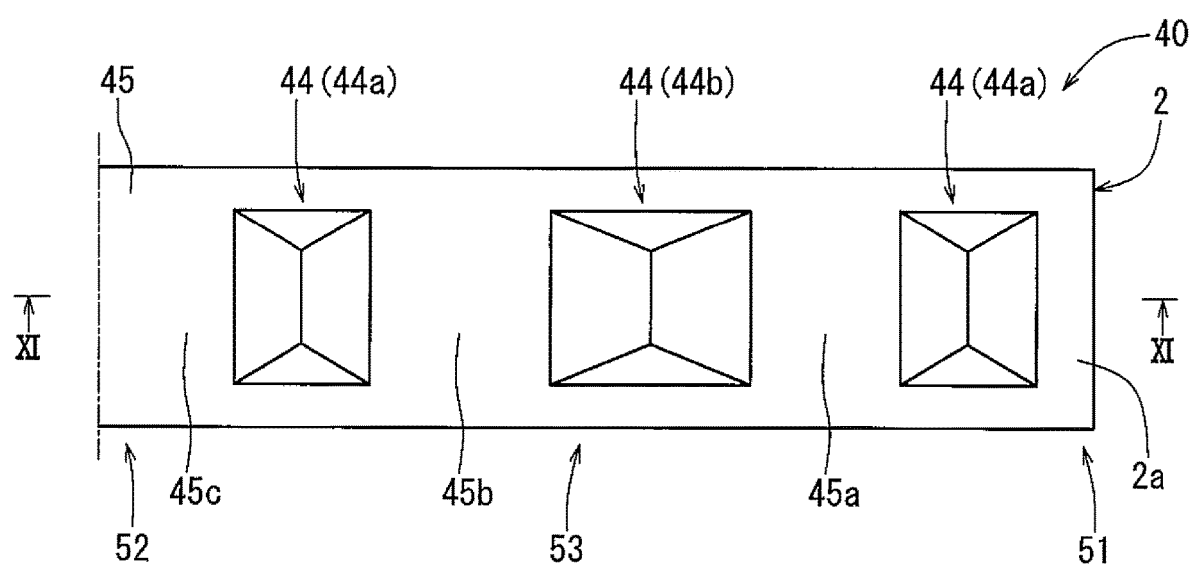
FIG. 10 is a plan view of the tolerance ring of FIG. 9, with a half of the circumferential portion expanded.
Figure 11:
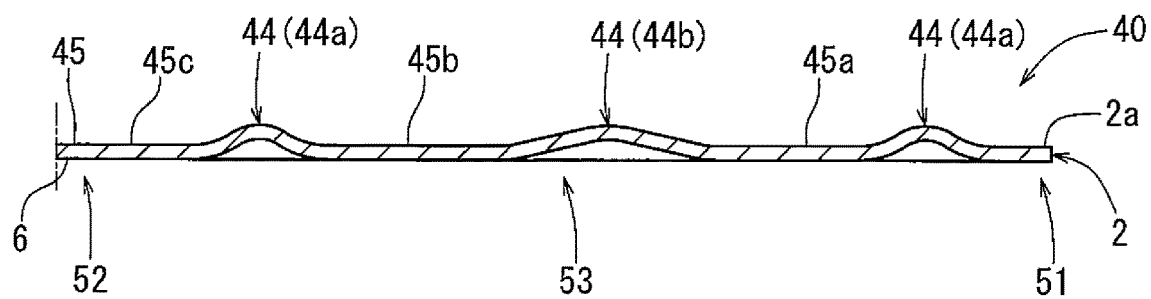
FIG. 11 is a cross-sectional view taken along line XI-XI in FIG. 10.

As shown in FIGS. 9 to 11, a small protrusion 44a, an interval 45a, a large protrusion 44b, an interval 45b, a small protrusion 44a, and an interval 45c are formed in this order on the outer peripheral cylindrical surface 45 in the first X-direction semi-circumferential region 53, the order being from the end edge 2a and along in the circumferential direction. The interval 45b nearer the straight line D2 is longer in a circumferential length than that the interval 45a nearest the end edge 2a. The interval 45c nearer the opposing portion 7 is shorter in circumferential length than the interval 45a nearer the end edge 2a. The distance between the pair of small protrusions 44a, the pair with the opposing portion 7 placed therebetween, is equivalent to twice the interval 45c.

As shown in FIG. 9, the pair of first protrusions 44a, the pair formed near the edge of the end edges 2a, is in the abutment joint semi-circumferential region 51, the region with the abutment joint portion 3 interposed in the circumferential direction. The pair of large protrusions 44b is positioned next to the first small protrusions 44a via the interval 45a. Approximately three quarters or two thirds (for example, 60% to 70%) of the large protrusion 44b, including the top may, be located in the abutment joint semi-circumferential region 51. The rest of the approximately one quarter or one third of the large protrusion 44b may be located in the opposing semi-circumferential region 52.

As shown in FIG. 9, the interval 45c is formed at the opposing portion 7 in the opposing semi-circumferential region 52. The pair of second small protrusions 44a is formed with this interval 45c interposed therebetween in the circumferential direction. The pair of large protrusions 44b is formed with respective second small protrusions 44a and intervals 45b interposed therebetween.

The X-direction component and the Y-direction component of a reaction force vector due to the rigidity of the protrusions 44 of the tolerance ring 40 will be described based on the analysis results shown in FIGS. 30 to 32. A right side of each graph in FIGS. 30 and 31 (the side at 170° of the horizontal axis) is the side of the abutment joint portion 3, while a left side of each graph (the side at 0° of the horizontal axis) is the side of the opposing portion 7. The general principles applied in FIG. 24 may also be applied to FIG. 30. A comparative tolerance ring in FIG. 30 includes a plurality of protrusions, each protrusion having an identical shape. In other words, in the comparative tolerance ring in FIG. 30, the positions of the tops of the protrusions are identical to the positions of the tops of the protrusions 44 of the tolerance ring 40 of this embodiment. However, the large protrusions 44b of the tolerance ring 40 of this embodiment are replaced with the small protrusions for the comparative example.

As shown in FIG. 30, the X1-direction component FX1 of the reaction force vector F in the region of the tolerance ring 40 where the large protrusions 44b are formed, is smaller than that of the corresponding region of the comparative tolerance ring.

As shown in FIG. 32, the sum ΣFY2 of the Y2-direction components FY2 of the reaction force vector F in the opposing semi-circumferential region 52 is slightly smaller than the sum ΣFY1 of the Y1-direction components FY1 of the reaction force vector F in the abutment joint semi-circumferential region 51, by about 0.4% of the sum ΣFY2 of the Y2-direction components FY2. The sum ΣFY1 of the X1-direction component FX1 of the reaction force vector F in the first X-direction semi-circumferential region 53 (which also equals the sum of the X2-direction components ΣFY2) is 99.5% of the sum of the Y1-direction components ΣFY1, and 99.9% of the sum of the Y2-direction components ΣFY2. In other words, the sum ΣFY1 of the X1-direction components FX1 is set to be slightly less than both the sum of the Y1-direction components FY1 ΣFY1 and the sum of the Y2-direction components ΣFY2, i.e., they are substantially identical.

Referring to FIGS. 2, 9, 26 and 32, the tolerance ring 40 exhibits substantially the same effect as the tolerance ring 1 shown in FIG. 1. Therefore, the outer peripheral member H deforms in a shape close to a perfect circle in cross section. It is thus possible to prevent deformation that causes the outer peripheral member H to become, for example, elliptical.

Figure 12:
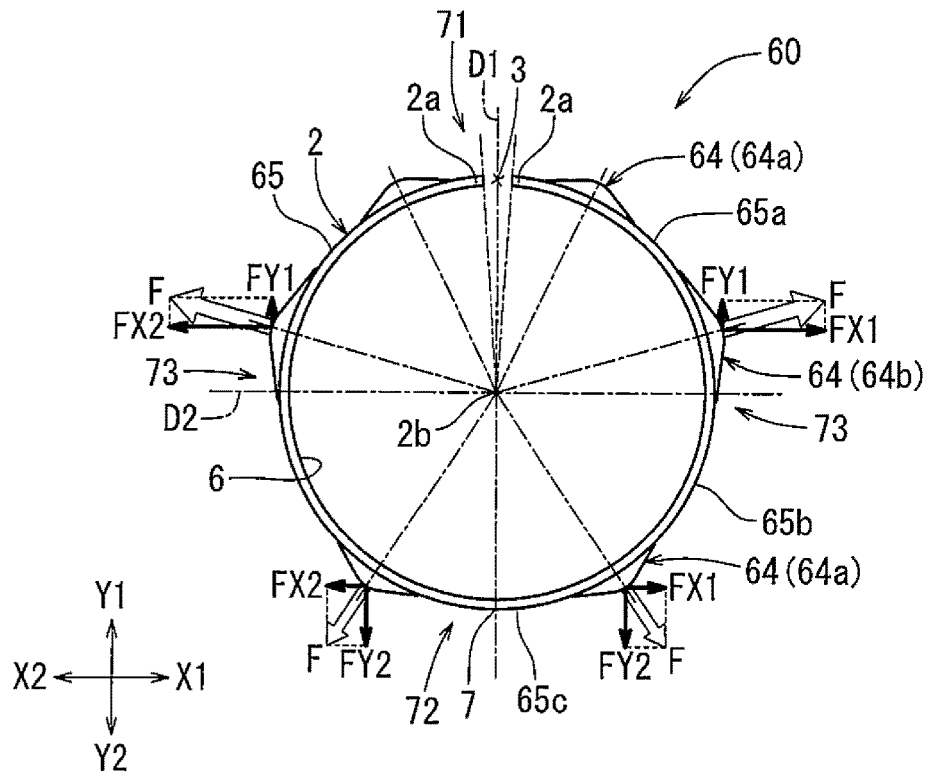
FIG. 12 is a front view of the tolerance ring according to a fourth embodiment.
Figure 13:
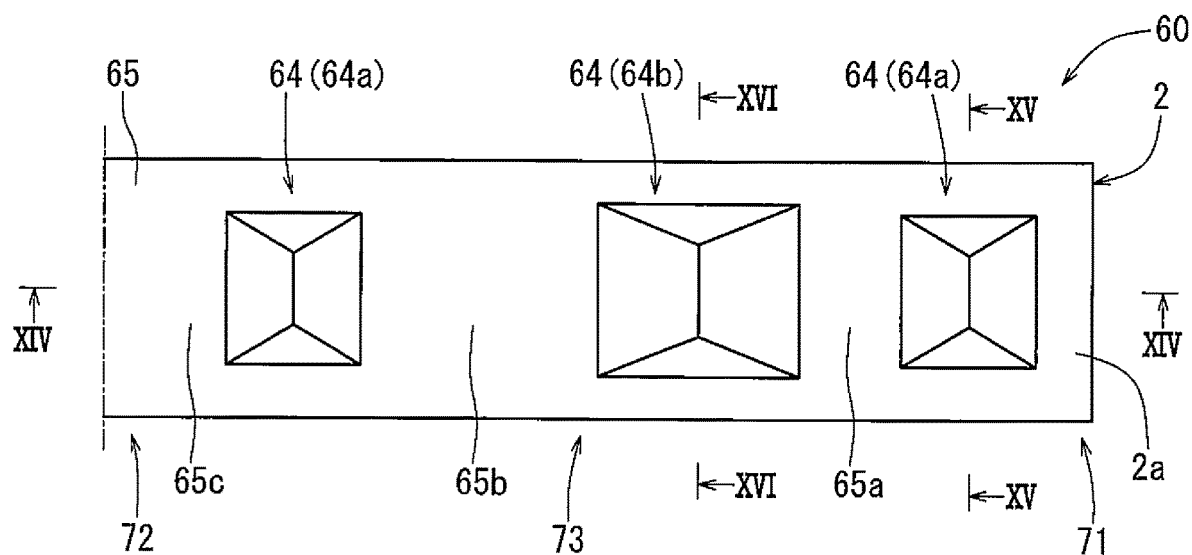
FIG. 13 is a plan view of the tolerance ring of FIG. 12, with a half of the circumferential portion expanded.
Figure 14:
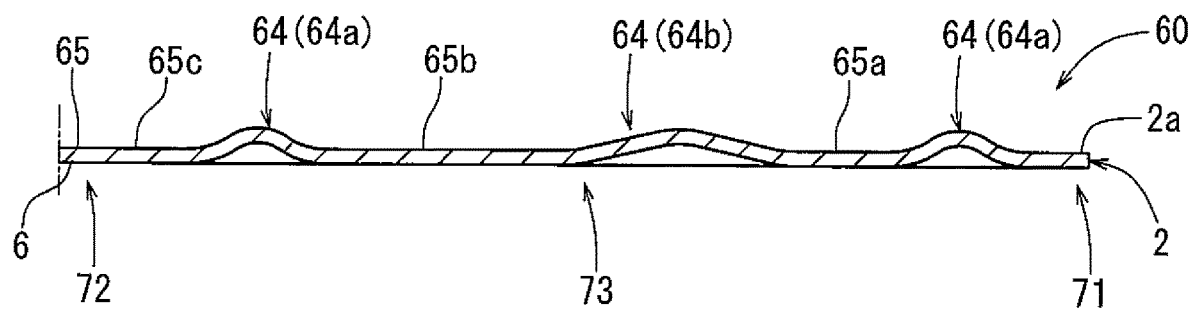
FIG. 14 is a cross-sectional view taken along line XIV-XIV in FIG. 13.
Figure 15:
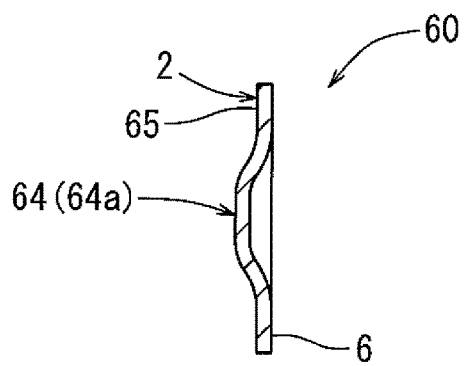
FIG. 15 is a cross-sectional view taken along line XV-XV in FIG. 13.
Figure 16:
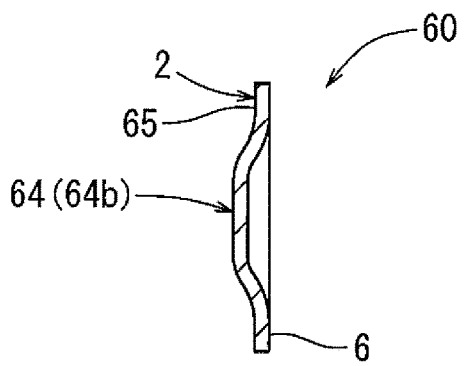
FIG. 16 is a cross-sectional view taken along line XVI-XVI in FIG. 13.

Another embodiment will be described with reference to FIGS. 12 to 16 and FIGS. 33 to 35. A tolerance ring 60 shown in FIGS. 12 to 16 includes a plurality of, for example six, protrusions 64 and on an outer peripheral cylindrical surface 65, alternative to the plurality of the protrusions 4 and on the outer peripheral cylindrical surface 5 of the tolerance ring 1 shown in FIG. 2. As shown in FIG. 12, the tolerance ring 60 includes an abutment joint semi-circumferential region 71 and an opposing semi-circumferential region 72, separated from each other by a straight line D2. The abutment joint semi-circumferential region 71 includes an abutment joint portion 3, and may, for example, include the abutment joint portion 3 in the center of a circular arc. The opposing semi-circumferential region 72 includes an opposing portion 7, and may, for example, include the opposing portion 7 in the center of the circular arc. The tolerance ring 60 includes a first X-direction semi-circumferential region 73 and a second X-direction semi-circumferential region 73, separated from each other by a straight line D1. The first and second X-direction semi-circumferential regions 73 each include the abutment joint portion 3 at one end and the opposing portion 7 at the other end.

As shown in FIGS. 12 to 16, a small protrusion 64a, an interval 65a, a large protrusion 64b, an interval 65b, a small protrusion 64a, and an interval 65c are formed in this order on the outer peripheral cylindrical surface 65 in the first X-direction semi-circumferential region 73, the order being from the end edge 2a and along in the circumferential direction. The interval 65b nearer the straight line D2 is longer in circumferential length than the interval 65a nearer the end edge 2a. The interval 65c nearer the opposing portion 7 is longer in circumferential length than the interval 65a nearer the end edge 2a and shorter in circumferential length than the interval 65b nearer the straight line D2. The distance between the pair of small protrusions 64a, the pair with the opposing portion 7 placed therebetween is equivalent to twice the interval 65c nearer the opposing portion 7.

As shown in FIGS. 13 to 16, the large protrusions 64b are longer in axial length than the small protrusions 64a and also longer in circumferential length than the small protrusions 64a. Therefore, the rigidity of the large protrusions 64b is lower than the rigidity of the small protrusions 64a.

As shown in FIG. 12, a pair of first protrusions 64a is formed near the edge of the end edges 2a in the abutment joint semi-circumferential region 71, with the abutment joint portion 3 interposed therebetween in the circumferential direction. The pair of large protrusions 64b is formed next to the respective first small protrusions 64a via the interval 65a nearer the end edge 2a. A substantial part (for example, 90% or more) of the large protrusions 64b, including the tops of the large protrusions 64b, is located in the abutment joint semi-circumferential region 71, while a small part that is the rest of the large protrusions 64b may be located in the opposing semi-circumferential region 72.

As shown in FIG. 12, the interval 65c is formed at the opposing portion 7 in the opposing semi-circumferential region 72. A pair of second small protrusions 64a is formed with this interval 65c interposed therebetween in the circumferential direction. A pair of intervals 65b is formed from respective circumferential sides of these second small protrusions 64a up to the border with the abutment joint semi-circumferential region 71.

The X-direction component and the Y-direction component of a reaction force vector F due to the rigidity of the protrusions 64 of the tolerance ring 60 will be described based on the analysis results shown in FIGS. 33 to 35. A right side of each graph depicted in FIGS. 33 and 34 (the side at 170° of the horizontal axis) is the side of the tolerance ring 60 with the abutment joint portion 3, while a left side of each graph (the side at 0° of the horizontal axis) is the side of the tolerance ring 60 with the opposing portion 7. The general principles applied in FIG. 24 may also be applied to FIG. 33. A comparative tolerance ring in FIG. 33 includes a plurality of protrusions, each protrusions having an identical shape. In other words, in the comparative tolerance ring in FIG. 33, the positions of the tops of the protrusions are identical to the positions of the tops of the protrusions 64 of the tolerance ring 60 of this embodiment. However, the large protrusions 64b of the tolerance ring 60 of this embodiment are replaced with the small protrusions.

As shown in FIG. 33, the X1-direction component FX1 of the reaction force vector F in the region of the tolerance ring 60 where the large protrusions 64b are formed, is smaller than that of the corresponding region of the comparative tolerance ring.

As shown in FIG. 35, the sum ΣFY2 of the Y2-direction component FY2 of the reaction force vector F in the opposing semi-circumferential region 72 is slightly greater than the sum ΣFY1 of the Y1-direction component FY1 of the reaction force vector F in the abutment joint semi-circumferential region 71, by about 0.3% of the sum ΣFY2 of the Y2-direction components FY2. The sum of the X1-direction components ΣFY1 (which is also substantially equal to the sum of the X2-direction components ΣFY2) of the reaction force vector F in the first X-direction semi-circumferential region 73 is 98.0% of both the sum of the Y1-direction components ΣFY1 and 97.7% of the sum of the Y2-direction components ΣFY2. In other words, the sum of the X1-direction components ΣFY1 is set to be slightly less than both the sum of the Y1-direction components ΣFY1 and the sum of the Y2-direction components ΣFY2, i.e., they are substantially identical.

Referring to FIGS. 2, 12, 26, and 35, the tolerance ring 60 of this embodiment exhibits substantially the same effect as the tolerance ring 1 shown in FIG. 1. Therefore, the outer peripheral member H deforms in a shape close to a perfect circle in cross section. It is thus possible to prevent deformation that causes the outer peripheral member H to become, for example, elliptical.

Figure 17:
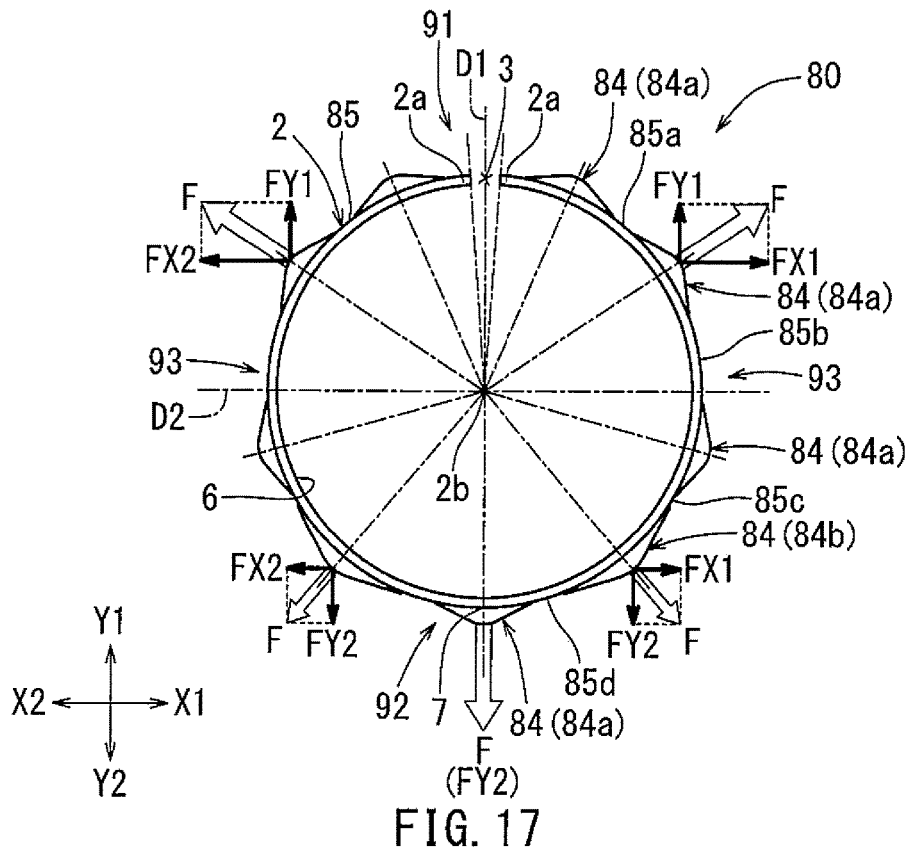
FIG. 17 is a front view of the tolerance ring according to a fifth embodiment.

Another embodiment will be described with reference to FIGS. 17 to 19 and FIGS. 36 to 38. A tolerance ring 80 shown in FIGS. 17 to 19, includes a plurality of, for example nine, protrusions 84 on an outer peripheral cylindrical surface 85, alternative to the plurality of the protrusions 4 on the outer peripheral cylindrical surface 5 of the tolerance ring 1 shown in FIG. 2. As shown in FIG. 17, the tolerance ring 80 includes an abutment joint semi-circumferential region 91 and an opposing semi-circumferential region 92, separated from each other by a straight line D2. The abutment joint semi-circumferential region 91 includes an abutment joint portion 3, and may, for example, include the abutment joint portion 3 in the center of a circular arc. The opposing semi-circumferential region 92 includes an opposing portion 7, and may, for example, include the opposing portion 7 in the center of the circular arc. The tolerance ring 80 includes a first X-direction semi-circumferential region 93 and a second X-direction semi-circumferential region 93, separated from each other by a straight line D1. The first and second X-direction semi-circumferential regions 93 each include the abutment joint portion 3 at one end and the opposing portion 7 at the other end. The present embodiment is an example where the reaction force vector due to the rigidity of the protrusions can be balanced, even when the total number of protrusions is odd.

Figure 18:
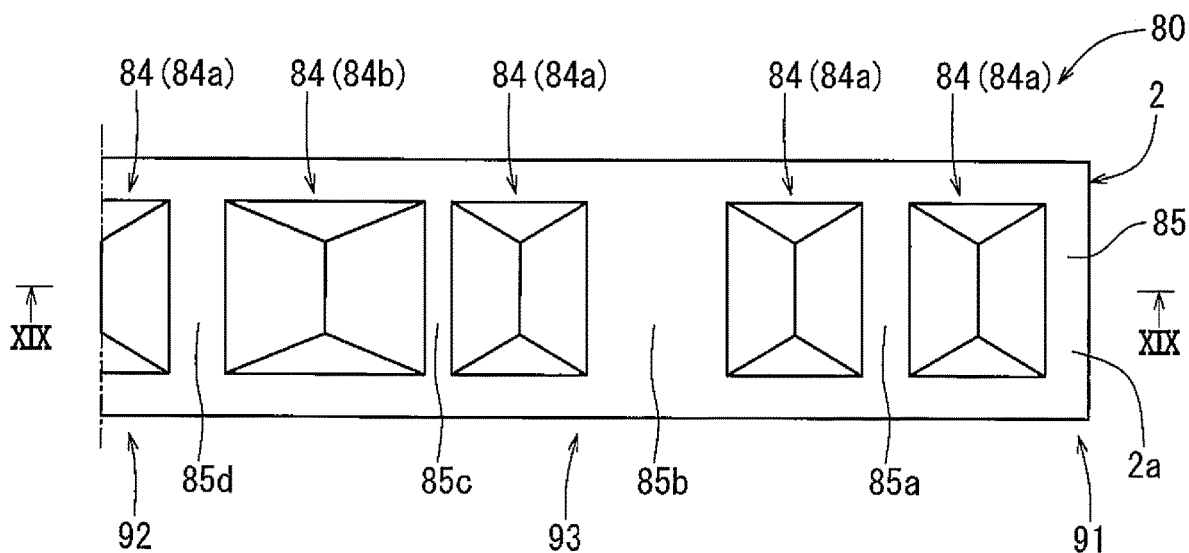
FIG. 18 is a plan view of the tolerance ring of FIG. 17, with a half of the circumferential portion expanded.
Figure 19:
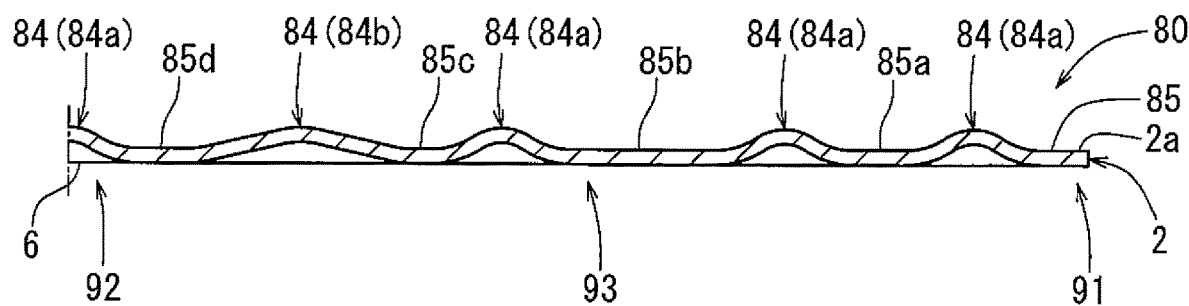
FIG. 19 is a cross-sectional view taken along line XIX-XIX in FIG. 18.

As shown in FIGS. 17 to 19, a small protrusion 84a, an interval 85a, a small protrusion 84a, an interval 85b, a small protrusion 84a, an interval 85c, a large protrusion 84b, an interval 85d, and a small protrusion 84a are formed in this order on the outer peripheral cylindrical surface 85 in the first X-direction semi-circumferential region 93, the order being from the end edge 2a and along in the circumferential direction. The interval 85b nearer the straight line D2 is longer in circumferential length than that the interval 85a nearer the end edge 2a. Another interval 85c is shorter in circumferential length than the interval 85a near the end edge 2a. The interval 85d nearer the opposing portion 7 is substantially the same in circumferential length as the interval 85a nearer the end edge 2a.

As shown in FIG. 17, the pair of first small protrusions 84a, the pair formed near the edge of the end edge 2a, is in the abutment joint semi-circumferential region 91, with the abutment joint portion 3 interposed therebetween in the circumferential direction. The pair of second small protrusions 84a is formed next to the first small protrusion 84a via the interval 85a. A pair of intervals 85b is formed on respective circumferential sides of the second small protrusion 84a nearer the end edge 2a, the intervals 85b extending to the boundary with the opposing semi-circumferential region 92.

As shown in FIG. 17, a single fourth small protrusion 84a, having a top at the opposing portion 7, is formed in the opposing semi-circumferential region 92. A pair of large protrusions 84b is formed at respective circumferential sides of the fourth small protrusion 84a, with an interval 85d interposed therebetween. A pair of third small protrusions 84a is formed with the respective large protrusions 84b and the respected interval 85c placed therebetween.

The X-direction component and the Y-direction component of a reaction force vector due to the rigidity of the protrusions 84 of the tolerance ring 80 will be described based on the analysis results shown in FIGS. 36 to 38. A right side of each graph in FIGS. 36 and 37 (the side at 170° of the horizontal axis) is the side of the abutment joint portion 3 of the tolerance ring 80, while a left side of each graph (the side at 0° of the horizontal axis) is the side of the opposing portion 7 of the tolerance ring 80. The general principles applied in FIG. 24 may also be applied to FIG. 36. A comparative tolerance ring in FIG. 36 includes a plurality of protrusions, each protrusion having an identical shape. In other words, in the comparative tolerance ring in FIG. 36, the positions of the tops of the protrusions are identical to the positions of the tops of the protrusions 84 of the tolerance ring 80 of this embodiment. However, the large protrusions 84b of the tolerance ring 80 of this embodiment are replaced with the small protrusions. The reaction force vector F due to the rigidity of the fourth small protrusions 84a was analyzed as acting on each of the first and second X-directional semi-circumferential regions 93 with a magnitude of one-half.

As shown in FIG. 36, the X1-direction component FX1 of the reaction force vector F in the region of the tolerance ring 80 where the large protrusions 84b are formed is smaller than that of the corresponding region of the comparative tolerance ring.

As shown in FIG. 38, the sum ΣFY2 of the Y2-direction component FY2 of the reaction force vector F in the opposing semi-circumferential region 92 is slightly less than the sum ΣFY1 of the Y1-direction component FY1 of the reaction force vector F in the abutment joint semi-circumferential region 91, by about 0.1% of the sum of the Y2-direction components ΣFY2. The sum ΣFY1 of the X1-direction components FX1 of the reaction force vector F in the first X-direction semi-circumferential region 93 (which is substantially equal to the sum ΣFY2 of the X2-directions components) is 99.0% of the sum of the Y1-direction components ΣFY1 and 99.1% of the sum of Y2-direction components ΣFY2. In other words, the sum of the X1-direction components ΣFY1 is set to be slightly less than both the sum of the Y1-direction components ΣFY1 and the sum of the Y2-direction components ΣFY2, i.e., they are substantially identical.

Referring to FIGS. 2, 17, 26, and 38, the tolerance ring 80 of this embodiment exhibits substantially the same effect as the tolerance ring 1 shown in FIG. 1. Therefore, the outer peripheral member H deforms in a shape close to a perfect circle in cross section. It is thus possible to prevent deformation that causes the outer peripheral member H to become, for example, elliptical.

Referring to FIG. 2 and FIG. 17, the number of the protrusions 84 in the abutment joint semi-circumferential region 91 may be, for example, four and the number of the protrusions 84 in the opposing semi-circumferential region 92 may be, for example, five. Therefore, the protrusions 84 formed in region nearer the opposing portion 7 are more closely arranged than in other regions. More specifically, the force exerted to an inner peripheral surface Ha of an outer peripheral member H tends to be relatively smaller particularly in the region nearer the abutment joint portion 3 of the abutment joint semi-circumferential region 91 than in other regions. The force exerted to the inner peripheral surface Ha of the outer peripheral member H in the near-edge region of the opposing portion 7 in the opposing semi-circumferential region 92 tends to be relatively smaller than in other regions, similar to the force in the near-edge region of the abutment joint portion 3. Therefore, protrusions 84 with greater rigidity are formed in the abutment joint semi-circumferential region 91, while the protrusions 84 arranged in the near-edge region of the opposing portion 7 are positioned more closely to each other. With this structure, it is possible to prevent the outer peripheral member H from deforming, particularly, into an elliptical shape extending in the X-direction.

Figure 20:
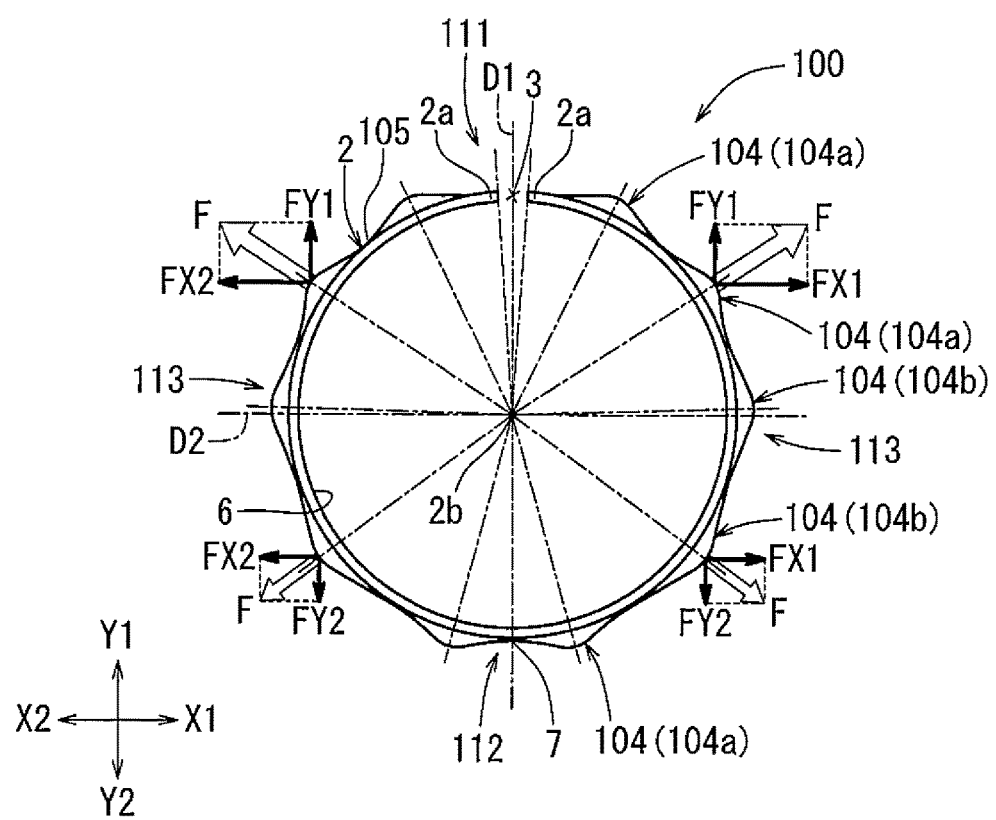
FIG. 20 is a front view of the tolerance ring according to a sixth embodiment.

Another embodiment will be described with reference to FIGS. 20 to 22 and FIGS. 39 to 41. A tolerance ring 100 shown in FIGS. 20 to 22 includes a plurality of, for example ten, protrusions 104 on an outer peripheral cylindrical surface 105, alternative to the plurality of the protrusions 4 on the outer peripheral cylindrical surface 5 of the tolerance ring 1 shown in FIG. 2. As shown in FIG. 20, the tolerance ring 100 includes an abutment joint semi-circumferential region 111 and an opposing semi-circumferential region 112, separated from each other by a straight line D2. The abutment joint semi-circumferential region 111 includes an abutment joint portion 3, and may, for example, include the abutment joint portion 3 in the center of a circular arc. The opposing semi-circumferential region 112 includes an opposing portion 7, and may, for example, include the opposing portion 7 in the center of the circular arc. The tolerance ring 100 includes a first X-direction semi-circumferential region 113 and a second X-direction semi-circumferential region 113, separated from each other by a straight line D1. The first and second X-direction semi-circumferential regions 113 each include the abutment joint portion 3 at one end and the opposing portion 7 at the other end. The present embodiment is an example where a reaction force vector F due to the rigidity of the protrusions can be balanced, even if the protrusions are arranged in a continuous fashion.

Figure 21:
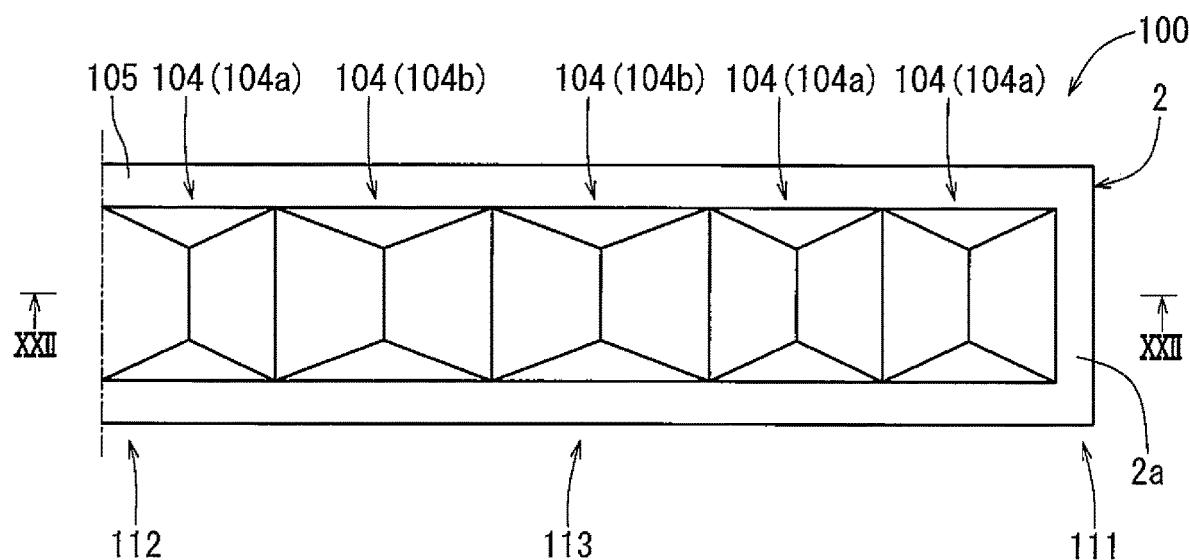
FIG. 21 is a plan view of the tolerance ring of FIG. 20, with a half of the circumferential portion expanded.
Figure 22:
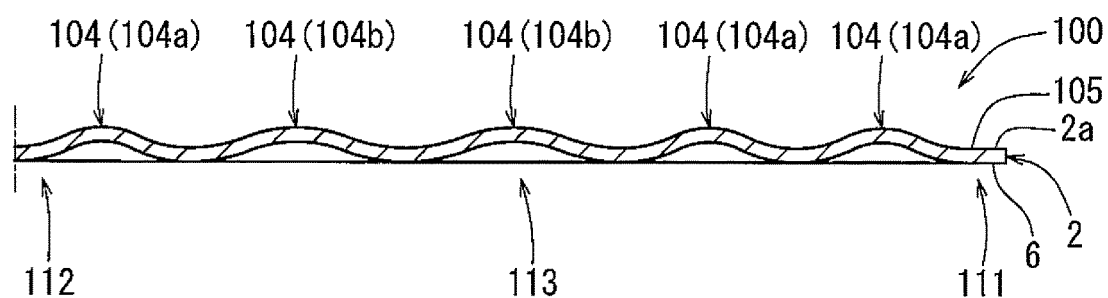
FIG. 22 is a cross-sectional view taken along line XXII-XXII in FIG. 21.

As shown in FIGS. 20 to 22, a small protrusion 104a, a small protrusion 104a, a large protrusion 104b, a large protrusion 104b, and a small protrusion 104a are formed in this order on the outer peripheral cylindrical surface 105 in the first X-direction semi-circumferential region 113, the order being from the end edge 2a and along in the circumferential direction. In this embodiment, no interval is formed between the protrusions 104. The small protrusions 104a of this embodiment are similar in shape to the small protrusions 4a of the tolerance ring 1 shown in FIGS. 2 to 5, except that they are longer in circumferential length than the small protrusions 4a of FIGS. 2 to 5. The large protrusions 104b of this embodiment are similar in shape to the large protrusions 4b of the tolerance ring 1 shown in FIGS. 2 to 5, except that they are longer in circumferential length than the large protrusions 4b of FIGS. 2 to 5. The rigidity of the small protrusions 104a of this embodiment is thus lower than the rigidity of the small protrusions 4a of the first embodiment. The rigidity of the large protrusions 104b of this embodiment is lower than the rigidity of the large protrusions 4b of the first embodiment. As shown in FIG. 20, the small protrusions 104a are substantially the same in radial height as the large protrusions 104b. Therefore, the tops of the small protrusions 104a and the tops of the large protrusions 104b may come evenly in contact with an inner peripheral surface Ha of an outer peripheral member H in a substantially circular cross-sectional fashion.

As shown in FIG. 20, a pair of the first small protrusions 104a is formed near the edge of the end edge 2a of the abutment joint semi-circumferential region 111, with the joint portion 3 interposed therebetween in the circumferential direction. The pair of second small protrusions 104a, the pair formed adjacent to respective first small protrusions 104a is formed. The pair of first large protrusions 104b is formed adjacent to respective second small protrusions 104a. Approximately half (e.g., 50% to 60%) of each of the first large protrusions 104b, including their tops, are located in the abutment joint semi-circumferential region 111, while the rest of the large protrusions 104b, a portion without their tops, is located in the opposing semi-circumferential region 112.

As shown in FIG. 20, a pair of the third small protrusions 104a is formed side by side via the opposing portion 7 of the opposing semi-circumferential region 112. A pair of the second large protrusions 104b is formed adjacent to respective third small protrusions 104a. A pair of the first large protrusions 104b is formed adjacent to respective second large protrusions 104b.

The X-direction component and the Y-direction component of the reaction force vector F due to the rigidity of the protrusions 104 of the tolerance ring 100 will be described based on the analysis results shown in FIGS. 39 to 41. A right side of each graph in FIGS. 39 and 40 (the side at 170° of the horizontal axis) is the side of the abutment joint portion 3 of the tolerance ring 100, while a left side of each graph (the side at 0° of the horizontal axis) is the side of the opposing portion 7 of the tolerance ring 100. The general principles applied in FIG. 24 may also be applied to FIG. 39. A comparative tolerance ring in FIG. 39 includes a plurality of protrusions, each protrusions having an identical shape. In other words, in the comparative tolerance ring in FIG. 39, the positions of the tops of the protrusions are identical to the positions of the tops of the protrusions 104 of the tolerance ring 100 of this embodiment. However, the large protrusions 104b of the tolerance ring 100 of this embodiment are replaced with the small protrusions.

As shown in FIG. 39, the X1-direction component FX1 of the reaction force vector F in the region of the tolerance ring 100 where the large protrusions 104b are formed is smaller than that of the corresponding region of the comparative tolerance ring.

As shown in FIG. 41, the sum ΣFY2 of the Y2-direction components FY2 of the reaction force vector F in the opposing semi-circumferential region 112 is slightly greater than the sum ΣFY1 of the Y1-direction components FY1 of the reaction force vector F in the abutment joint semi-circumferential region 111, by about 5.5% of the sum of the Y2-direction components ΣFY2. The sum ΣFY1 of the X1-direction component FX1 of the reaction force vector F in the first X-direction semi-circumferential region 113 (which is about the same as the sum of the X2-direction components ΣFY2) is 99.4% of the sum of the Y1-direction components ΣFY1 and 94.9% of the sum of the Y2-direction components ΣFY2. In other words, the sum of the X1 direction components ΣFY1 is set to be slightly less than both the sum of the Y1-direction components ΣFY1 and the sum of the Y2-direction components ΣFY2, i.e., substantially identical.

Referring to FIGS. 2, 20, 26 and 41, the tolerance ring 100 exhibits the same effect as the tolerance ring 1 shown in FIG. 1. Therefore, the outer peripheral member H deforms in a shape close to a perfect circle in a cross section. It is thus possible to prevent such a deformation that the outer peripheral member H becomes, for example, elliptical.

Various modifications may be made to the above-described tolerance rings 1, 20, 40, 60, 80, 100. The ratio of the sum ΣFY of the X-direction components FX of the reaction force vector F due to the rigidity of the protrusions in the X-direction semi-circumferential region with respect to the sum ΣFY1 of the Y1-direction components FY1 of the reaction force vector F due to the rigidity of the protrusions in the abutment joint semi-circumferential region may preferably be close to 1. Additionally, the ratio of the sum ΣFY of the X-direction components FX of the reaction force vector F due to the rigidity of the protrusions in the X-direction semi-circumferential region with respect to the sum ΣFY2 of the Y2-direction components FY2 of the reaction force vector F due to the rigidity of the protrusions in the opposing semi-circumferential region may preferably be close to 1. The ratio of the sum of the X-direction components ΣFY with respect to the sum of the Y1-direction components ΣFY1 as well as the ratio of sum of the X-direction components ΣFY with respect to the sum of the Y2-direction components ΣFY2 may appropriately be changed between 0.77 to 1.2. If the ratio is smaller than 0.77, the outer peripheral member H may elliptically deform in the Y-direction by a non-negligible extent. If the ratio is greater than 1.2, the outer peripheral member H may elliptically deform in the X-direction by a non-negligible extent.

In each of the embodiments, the protrusions are described as being arranged in one row in the circumferential direction of the tolerance ring, however, the arrangement of the protrusions should not be limited thereto. For example, it may be structured so that the rows of the protrusions arranged in the circumferential direction may be axially arranged in parallel in two or more rows. The shape of the protrusions may also be changed accordingly. For example, the protrusions 4a, 4b of the first embodiment may have their circumferential length or axial length modified. For example, alternative to the protrusions 4 of the first embodiment, a shape, such as a triangular shape or a hexagonal shape when viewed from the radial direction, may be used for the protrusions 4. The number of protrusions formed on the tolerance ring, types of the protrusions, such as small protrusions or large protrusions, intervals between adjacent protrusions, etc., may be selected without being limited to those as described in each of the above embodiments. As long as the tolerance ring is used in a state being fitted between a shaft member S and an outer peripheral member H, the present disclosure may be applied to various tolerance rings. These tolerance rings are not limited to, for example, those to be fitted to a shaft member S having a spline fit.

Various embodiments described in detail with reference to the accompanying drawings are representative examples of the present invention and thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved tolerance ring and/or methods of making and using the same.

The invention claimed is:

1. A tolerance ring disposed between a shaft member and an outer peripheral member enclosing the shaft member in a circumferential direction, comprising:
a ring body having a spring property and a cylindrical shape;
an abutment joint portion defined between circumferential end edges of the ring body;
a plurality of protrusions protruding radially from the ring body, each of the plurality of protrusions having a reaction force vector due to radial rigidity, wherein the plurality of protrusions includes a plurality of circumferentially-alternating small and large protrusions;
an abutment joint semi-circumferential region that includes the abutment joint portion at its center;
an opposing semi-circumferential region including an opposing portion at its center, the opposing portion facing the abutment joint portion in a radial direction; and
first and second X-direction semi-circumferential regions separated by a straight line connecting the abutment joint portion and the opposing portion,
wherein a Z-direction is a direction along an axis center of the ring body, a Y-direction is a direction passing through the axis center of the ring body and the abutment joint portion, and an X-direction is a direction orthogonal to the Y-direction and the Z-direction,
wherein a sum of X-direction components of the reaction force vector in the first X-direction semi-circumferential region is equal to or smaller than a sum of Y-direction components of the reaction force vector in the abutment joint semi-circumferential region, when each of the reaction force vector of each protrusion is decomposed into an X-direction component and a Y-direction component,
wherein the plurality of small protrusions includes a first small protrusion and a second small protrusion,
wherein the first small protrusion, a first interval, a large protrusion of the plurality of large protrusions, a second interval, and the second small protrusion are formed in the first X-direction semi-circumferential region in order from the end edge and along in the circumferential direction,
wherein the large protrusion is longer in circumferential width than the first small protrusion and the second small protrusion,
wherein the first interval is shorter in circumferential width than the second interval, and
wherein a third interval between the second small protrusion and the opposing portion facing the abutment joint portion is shorter in circumferential width than the first interval.

2. The tolerance ring according to claim 1, wherein a difference in the sum of the Y-direction components of the reaction force vector in the abutment joint semi-circumferential region and a sum of the Y-direction components of the reaction force vector in the opposing semi-circumferential region is equal to or less than 10% of the sum of the Y-direction components of the reaction force vector in the opposing semi-circumferential region.

3. The tolerance ring according to claim 1, wherein at least two of the plurality of the protrusions have different circumferential width and/or axial lengths.

4. The tolerance ring according to claim 1, wherein:
a first protrusion of the plurality of protrusions is positioned in the abutment semi-circumferential region,
a second protrusion of the plurality of protrusions is positioned in the opposing semi-circumferential region, and
the first and second protrusions have approximately the same rigidity.

5. The tolerance ring according to claim 1, wherein 60% to 70% of the large protrusion, including the top thereof, is located in the abutment joint semi-circumferential region, while the rest of the large protrusion is located in the opposing semi-circumferential region.

* * * * *